US007217190B2

(12) United States Patent
Weiss

(10) Patent No.: US 7,217,190 B2
(45) Date of Patent: May 15, 2007

(54) CASHLESS GAMING SYSTEM: APPARATUS AND METHOD

(75) Inventor: Steven A. Weiss, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 360 days.

(21) Appl. No.: 10/308,314

(22) Filed: Dec. 2, 2002

(65) Prior Publication Data

US 2003/0083127 A1 May 1, 2003

Related U.S. Application Data

(63) Continuation of application No. 08/908,300, filed on Aug. 7, 1997, now Pat. No. 6,511,377.

(51) Int. Cl.
*G06F 19/00* (2006.01)

(52) U.S. Cl. .......................................... 463/25; 463/42

(58) Field of Classification Search .................. 463/29, 463/25, 23, 20, 19, 18, 17, 16, 42, 41, 40; 273/143 R, 138.2; 902/23
See application file for complete search history.

(56) References Cited

U.S. PATENT DOCUMENTS

| | | | | |
|---|---|---|---|---|
| 4,072,930 | A | 2/1978 | Lucero et al. | 340/152 T |
| 4,283,709 | A | 8/1981 | Lucero et al. | 340/147 R |
| 4,517,656 | A | 5/1985 | Solimeno et al. | 364/900 |
| 4,575,622 | A | 3/1986 | Pellegrini | 235/382 |
| 4,636,951 | A | 1/1987 | Harlick | 364/412 |
| 4,722,053 | A | 1/1988 | Dubno et al. | 364/401 |
| 5,038,022 | A | 8/1991 | Lucero | 235/380 |
| 5,179,517 | A | 1/1993 | Sarbin et al. | 364/410 |
| 5,197,094 | A | 3/1993 | Tillery et al. | 379/91 |
| 5,262,938 | A | 11/1993 | Rapoport et al. | 364/401 |
| 5,265,874 | A | 11/1993 | Dickinson et al. | 273/138 A |
| 5,321,241 | A | 6/1994 | Craine | 235/380 |
| 5,326,104 | A | 7/1994 | Pease et al. | 273/138 |
| 5,429,361 | A * | 7/1995 | Raven et al. | 463/25 |
| 5,457,206 | A | 10/1995 | Moder | 548/205 |
| 5,470,079 | A | 11/1995 | LeStrange et al. | 273/138 A |
| 5,557,086 | A | 9/1996 | Schulze et al. | 235/380 |
| 5,674,128 | A | 10/1997 | Holch et al. | 463/42 |
| 5,770,533 | A | 6/1998 | Franchi | 463/42 |
| 5,779,549 | A | 7/1998 | Walker et al. | 463/42 |
| 5,796,831 | A | 8/1998 | Paradinas et al. | 380/24 |

(Continued)

FOREIGN PATENT DOCUMENTS

AU 702021 1/1996

(Continued)

*Primary Examiner*—John M. Hotaling, II
*Assistant Examiner*—Tramar Harper
(74) *Attorney, Agent, or Firm*—McAndrews, Held & Malloy, Ltd.

(57) ABSTRACT

An apparatus and method for cashless gaming wherein a player can access credits via a pin activated keypad located on the gaming machine. Real-time accounting allows the player to redeem credits and secure perquisites as a function of patronage. A player account is created which has an account balance amount. A player can remove a quantity of credits from a credit meter of the gaming machine in accordance with a selected amount and uploaded the selected amount to the player account to increase the account balance amount.

20 Claims, 11 Drawing Sheets

U.S. PATENT DOCUMENTS

| | | | | | |
|---|---|---|---|---|---|
| 5,800,268 | A | | 9/1998 | Molnick | 463/40 |
| 5,811,772 | A | * | 9/1998 | Lucero | 235/380 |
| 5,816,917 | A | | 10/1998 | Kelmer et al. | 463/16 |
| 5,816,919 | A | | 10/1998 | Scagnelli et al. | 463/25 |
| 5,839,956 | A | | 11/1998 | Takemoto | 463/25 |
| 5,845,263 | A | | 12/1998 | Damaisa et al. | 705/27 |
| 5,902,983 | A | * | 5/1999 | Crevelt et al. | 235/380 |
| 5,919,091 | A | * | 7/1999 | Bell et al. | 463/25 |
| 5,971,849 | A | | 10/1999 | Falciglia | 463/16 |
| 6,048,269 | A | | 4/2000 | Burns et al. | 463/25 |
| 6,071,190 | A | | 6/2000 | Weiss et al. | 463/25 |
| 6,089,982 | A | * | 7/2000 | Holch et al. | 463/42 |
| 6,110,041 | A | | 8/2000 | Walker et al. | 463/20 |
| 6,135,884 | A | | 10/2000 | Hedrick et al. | 463/20 |
| 6,165,071 | A | | 12/2000 | Weiss | 463/24 |
| 6,168,522 | B1 | | 1/2001 | Walker et al. | 463/25 |
| 6,254,483 | B1 | | 7/2001 | Acres | 463/26 |
| 6,319,125 | B1 | | 11/2001 | Acres | 463/25 |
| 6,371,852 | B1 | | 4/2002 | Acres | 463/25 |
| 2002/0142846 | A1 | | 10/2002 | Paulsen | 463/43 |
| 2002/0155887 | A1 | | 10/2002 | Criss-Puszkiewicz et al. | |

FOREIGN PATENT DOCUMENTS

| | | | |
|---|---|---|---|
| AU | B-70382/94 | | 8/1997 |
| AU | 2001 43882 | A1 | 11/2001 |
| DE | 3433774 | | 3/1986 |
| DE | 4039732 | | 8/1992 |
| EP | 0 051 579 | | 5/1982 |
| EP | 0 208 857 | | 1/1987 |
| EP | 0 219 306 | | 4/1987 |
| EP | 0 588 625 | A1 | 3/1994 |
| GB | 1 545 301 | | 5/1979 |
| GB | 2 151 054 | A | 7/1985 |
| GB | 2 236 423 | A | 4/1991 |
| GB | 2 241 098 | A | 8/1991 |
| GB | 2 282 690 | A | 4/1995 |
| WO | WO 98/35309 | | 8/1998 |
| WO | WO 98/40140 | | 9/1998 |

* cited by examiner

CASHLESS GAMING SYSTEM: APPARATUS AND METHOD

This is a continuation of U.S. application Ser. No. 08/908,300, filed Aug. 7, 1997 now U.S. Pat. No. 6,511,377.

FIELD OF THE INVENTION

The present invention relates generally to cashless gaming systems and, in particular, to a real-time cashless gaming apparatus and method for operating gaming machines with player cards by downloading funds from a pre-established account and crediting/debiting the account based on, inter alia, resultant game play. In addition, a redemption apparatus and method is provided for players to access their available account balances with their player cards and redeem their balances for cash and perquisite vouchers directly from the redemption apparatus.

BACKGROUND OF THE INVENTION

Gaming machines, particularly slot machines, have become one of the more exciting wagering adventures available at casinos and the like and have also been a source of greater revenue for gaming establishments over the last few years. Typically, a player obtains tokens, which may be coins or the like, from a stationary or roving change clerk prior to playing any particular slot machine. The disadvantage to this game playing technique is that a player who runs out of tokens must either wait for the roving change clerk to continue game play or walk away from the machine and find a stationary change clerk or cashier to get more tokens. Thus, this technique tends to interrupt game play thereby reducing profits and disrupting the player's excitement and entertainment experience enjoyed by continuous game play. In addition, this technique may require the player to carry a substantial amount of currency and/or tokens. Furthermore, the player may lose his or her place at the previously chosen machine and/or the player, while seeking out tokens, may decide not to resume play.

Moreover, a bill validator may be disposed at each machine for receiving bills and loading a corresponding amount of play credit onto the machine for game play. This technique requires the player to repetitively operate the bill validator by removing a bill from one's pocket and inserting it into the validator and awaiting validation and the corresponding placement of play credits onto the machine. Thus, this technique also interrupts game play and the corresponding excitement and entertainment associated with continuous game play. In addition, a certain amount of time is consumed by the repetitive operation of the bill validator thereby resulting in a reduction of revenue for the casino in that it reduces the amount of money fed to the machine over a period of time. Furthermore, this technique may require the player to carry a substantial amount of currency and to also carry the burden of the concern of carrying large sums of currency.

Alternatively, it has been proposed to use a general purpose charge card such as a VISA, MASTERCARD or AMERICAN EXPRESS CARD. The card is inserted into a card reader disposed at a gaming machine and the proper card identification and desired amount of funds to be borrowed on credit is entered via a keyboard. This information is then transmitted to a remote financial institution either directly or through an intermediate transaction processing facility. The remote institution must then verify the information and approve the requested funds prior to the machine being enabled for play and then, once verified, the entire requested balance is indiscreetly displayed on a display for all to see. First of all, this technique requires a player to have previously qualified for credit with the remote financial institution. In addition, this technique exposes the player to the theft or loss of the card by, for example, forgetting the card in the gaming machine. As a result of the card being a general charge card, it may be used for purchases by one other then the rightful owner. Furthermore, the player has to depend on the remote institution to obtain credit and the repayment of this credit by the player is typically coupled with interest thereby adding an additional cost to game play. The casino is also required to reconcile the player's account with the remote institution which requires time and adds to the overhead of the casino. For example, U.S. Pat. No. 5,457,306 teaches this technique.

Another proposal is to have the player hand over an ID card and a desired amount of money to a clerk at a validation terminal. The clerk then stores the ID number and the amount of money in a memory associated with the terminal. The ID card is then returned to the player whereupon the player selects a game terminal which simply reads the player's card and downloads and displays the entire cash amount to the selected game terminal. The player is required to cashout before playing a different game terminal. This technique, inter alia, fails to provide a secure control over the ID card. For example, if the card is lost or stolen, it may still be used at a gaming terminal by simply having the terminal read the card. In addition, this technique provides no discretion for concealing one's entire balance on the card as a result of the entire amount being continuously displayed on the display and as the game is progressively played. For example, U.S. Pat. No. 5,265,874 teaches this technique.

The following prior art reflects the state of the art of which applicant is aware and is included herewith to discharge applicant's acknowledged duty to disclose relevant prior art.

| U.S. Pat. No. | ISSUE DATE | INVENTOR |
|---|---|---|
| 5,457,306 | Oct. 10, 1995 | Lucero |
| 5,197,094 | Mar. 23, 1993 | Tellery, et al. |
| 5,265,874 | Nov. 30, 1993 | Dickenson, et al. |
| 5,038,022 | Aug. 6, 1991 | Lucero |
| 4,575,622 | Mar. 11, 1986 | Pellegrini |

SUMMARY OF THE INVENTION

The present invention is distinguished over the known prior art in a multiplicity of ways. For one thing, the present invention provides a system which enhances the players excitement and entertainment experience by providing means for allowing continuous game play. In addition, the present invention eliminates the need for a player to carry a substantial amount of currency and/or tokens. In addition, the present invention eliminates the need for a player who has run out of tokens during game play from either having to wait for a roving change clerk to continue game play or having to walk away from the gaming machine and find a stationary change clerk or cashier to obtain additional tokens. The present invention also eliminates the need for a player to have to repetitively operate a bill validator to obtain play credits for playing a particular gaming machine.

Moreover, the present invention provides a cashless gaming system which includes a player cards which are each secured by a player-selected or randomly assigned personal identification number. Thus, if the player's card is lost or stolen, it may not be simply inserted into a gaming machine by unauthorized user for game play. In addition, since the player's card of the present invention is not a general charge card it may not be used for general purchases of merchandise by unauthorized personal. The cashless gaming system also allows the casino to directly reconcile all player accounts thereby eliminating the time and overhead associated with the casino dealing with a remote institution.

Furthermore, the cashless gaming system provides discretion in displaying the entire balance of a player's account by, inter alia, allowing the player to incrementally download a portion of the account balance onto the machine and have the downloaded balance displayed as game credits.

In a preferred form, the cashless gaming system includes a real-time gaming account wagering system which allows players to establish an electronic account as easily as selecting a personal identification number and depositing funds at an enrollment station. Deposits can be comprised of cash, chips, checks or marker proceeds. After the account has been established, the player receives a player card which may be used at any gaming machine. The electronic account is accessed at any particular gaming machine via the player card and the associated personal identification number. The player accesses funds from the electronic account by simply inserting the player tracking card into a card reader, entering the personal identification number associated with the card and selecting an option from an easy to use card reader display menu. These options preferably include: balance inquiry, receive funds and return funds.

The balance inquiry provides the player with their current account balance minus any credits currently on the gaming machine which have been previously downloaded thereto. The receive funds option allows the player to request that a dollar amount be transferred from their account to a gaming machine credit meter. A minimum dollar amount which may be requested by the player can be configured in the account wagering system software. The player may deposit funds directly into the electronic account from the gaming machine being played via a coin or bill acceptor. The return funds option retrieves all credits on the credit meter of the gaming machine and transfers them to the player's electronic account.

The cashless gaming system also provides means for rewarding perquisites or complementaries to any particular player based on that players profile. The perquisites can be directly appended to the players electronic account and can be accessed via the associated player card. In addition, the system includes means for rewarding bonus points based on the players profile and crediting these bonus points directly to the player's electronic account. Thus, these bonus points may be downloaded onto any particular gaming machine as play credits by simply accessing the player's electronic account with the associated players card. Typically, the cashless gaming system tracks all player activity and accumulates bonus player points and complimentary dollars from gaming machines and even table games. A player tracking module translates the points into redeemable cash value in dollars.

In addition, the system includes a redemption apparatus in which players may access their available account and/or promotional balances with their player cards and redeem these balances for cash and perquisite vouchers directly from the redemption apparatus. The redemption apparatus includes a computer which is integrated into the cashless gaming system. Preferably, the redemption apparatus is a free standing super structure which is presented to the player on the casino floor and which encloses the computer, a UPS battery back up, a touch screen monitor, a card reader assembly and a printer.

The redemption apparatus displays a sequence of attraction messages during idle periods and becomes active when a user touches an information button on the touch screen or inserts their players card into a card reader. The redemption apparatus allows players to access their available point balance and to redeem their point balances into cash and perquisite vouchers which are distributed directly from the redemption apparatus. Specifically, cash redemption is accomplished by the player inserting their players card into the redemption apparatus to start the redemption process. Before any point information will be displayed, the player is required to enter their associated PIN which has been registered at the enrollment station. The player can select the dollar amount to be redeemed from the redemption apparatus. If the player wishes to redeem any of their points for cash, the redemption apparatus will print a voucher for that amount. In the event that a player cannot redeem their points an error message will be displayed to the user asking them to go to any enrollment station for reconciliation of the account.

Perquisite redemption is obtained in a similar manner. The player inserts their player card into the redemption apparatus to start the redemption process. The player is then required to enter their personal identification number to access their electronic account. If the player chooses to redeem any of their perquisite dollars for complimentaries, they are prompted to select the number of guest and the location in which the voucher is to be used. The redemption apparatus will then print a voucher for that location for a predetermined amount. Error messages will direct the player to go to any enrollment station if they cannot redeem their comp dollars.

The cashless gaming system retrieves the players name and verifies the personal identification number through the player tracking module. Current point information, the amount of available cash dollars, the amount of available comp dollars and the redemption of any dollars for cash or complimentaries will also be handled through the player tracking module. Both cash and complimentary redemption forms may be designed through the player tracking module. An on-line gaming information system with a player tracking module allows all player activity to be monitored and accumulates player points and complimentary dollars from both gaming machines and table games.

Specifically, players may be monitored at a table game by simply giving their player card to pit personnel and having the pit personnel note the player start time. After the player has finished, the pit personnel enters rating information into the player tracking system. Thus, points and complimentary dollars are accumulated based on player skill rating, play time, game speed, average bets or other criteria.

OBJECTS OF THE INVENTION

Accordingly, it is an object of the present invention to provide a new and novel cashless gaming system: apparatus and method.

A further object of the present invention is to provide a system as delineated supra which includes a real-time account wagering system and an on-line accounting and information system which interface with a variety of different manufactures makes and models of gaming machines.

Another further object of the present invention is to provide a system as characterized above which provides means for real-time data collection and accessibility of information by continually moving through the system in real-time.

Another further object of the present invention as characterized above which provides a player with the opportunity of opening an electronic account at an enrollment station and depositing funds into their account using cash, chips, a check or a marker.

Another further object of the present invention is to provide a system as characterized above which allows a player to access funds deposited into their electronic account directly from a gaming machine.

Another further object of the present invention is to provide a player tracking system which allows carded players to be tracked during play of table games, electronic gaming machines or other gaming devices or entities.

Another further object of the present invention is to provide a system as characterized above which allows a player to select a personal identification number for security and to use the personal identification number when accessing their electronic account via a player tracking card interfacing with a keypad assembly.

Another further object of the present invention is to provide a system as characterized above which includes providing secure playing cards to each individual who has opened an electronic account.

Another further object of the present invention is to provide a system as characterized above which eliminates the need for a player to carry a substantial amount of currency and/or tokens and to assure that the player always has the right denomination on hand in order to play any particular table game or gaming machine.

Another further object of the present invention is to provide a system as characterized above which includes means for rewarding perquisites to any particular player based on that player's profile and depositing them directly to the player's electronic account.

Another further object of the present invention is to provide a system as characterized above which includes means for crediting bonus points directly to any player's electronic account.

Another further object of the present invention is to provide a system as characterized above which includes credit downloading means to allow the player to transfer, display and wager a player selected amount of the player's funds.

Another further object of the present invention is to provide a system as characterized above which includes real-time accounting means communicating with both the card reading means and the player's card to enable any particular gaming machine for game play and to immediately update player status as a function of player wagering activity.

Another further object of the present invention is to provide a system as characterized above which includes a redemption apparatus in which players may access their available account balances with their player cards and redeem these balances for cash and perquisite vouchers directly from the redemption apparatus.

Viewed from a first vantage point it is an object of the present invention to provide an apparatus for conducting cashless gaming by a player comprising, in combination: a player card, means for initializing the player card for use in a gaming machine, player card reading means operatively coupled to the gaming machine, credit downloading means to allow the player to transfer, display and wager some of the player's funds, real-time accounting means communicating with both the initializing means and the player card reading means to enable the gaming machine to immediately update player status as a function of player wagering activity.

Viewed from a second vantage point it is an object of the present invention to provide a method of playing gaming machines operatively coupled to an on-line cashless wagering system, including the steps of: establishing an electronic account in a database associated with the system; associating a player selected identification number to a player card for accessing the player's electronic account stored in the database; coupling a card reader assembly to at least one gaming machine and the system, the assembly including a card reader, a keypad and a display; accessing the player's account by coupling the player card to the card reader and entering the associated player identification number via the keypad; downloading by the player up to all of the funds in the account to at least the one machine; enabling game play of the machine by wagering an amount of the downloaded funds; and updating the player account in real-time to immediately update player status as a function of player wagering activity.

Viewed from a third vantage point it is an object of the present invention to provide a method of conducting cashless gaming on a gaming machine by a player, including the steps of: providing a player card to at least one player, initializing the player card with initializing means for use in a gaming machine, providing a card reader means operatively coupled to the gaming machine for inserting the player card, providing an input means operatively coupled to the gaming machine for entering a player related personal identification number, providing means for downloading a player selected amount of the player's funds to the gaming machine, providing a meter for displaying the selected amount as credits, and linking together both the initializing means and the card reading means with a real-time accounting means to enable said gaming machine to immediately update player status as a function of player wagering activity.

These and other objects will be made manifest when considering the following detailed specification when taken in conjunction with the appended drawing figures.

DESCRIPTION OF PREFERRED EMBODIMENTS

Figure 1:
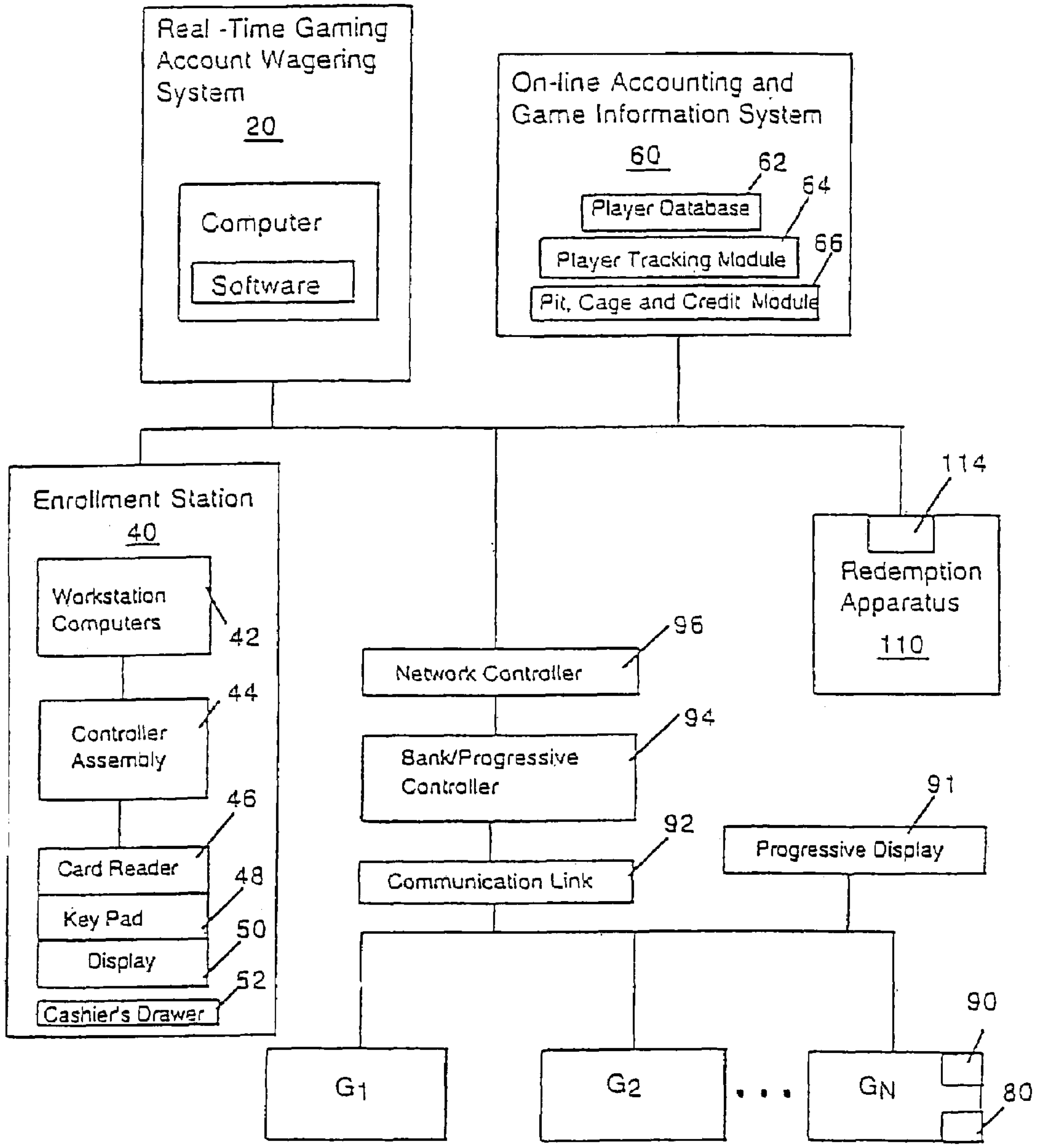
FIG. 1 is a basic block diagram of the cashless gaming system according to the present invention.

Considering the drawings, wherein like reference numerals denote like parts throughout the various drawing figures, reference numeral 10 is directed to the cashless gaming system according to the present invention.

Figure 2:
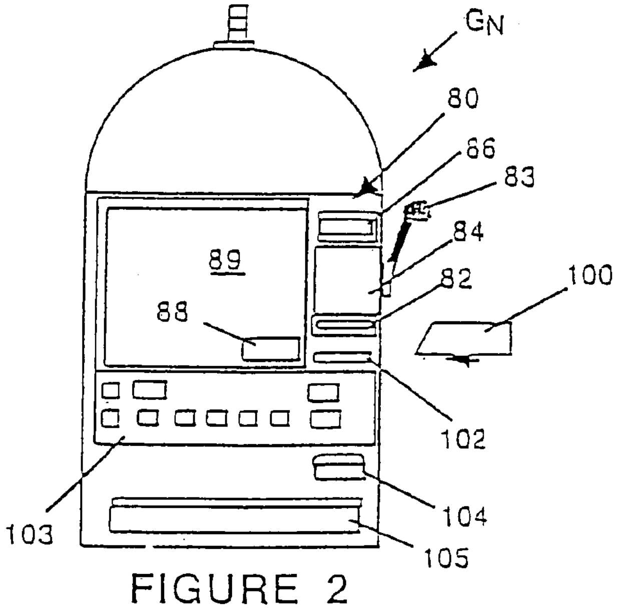
FIG. 2 is a front view of a gaming machine according to one form of the present invention and upon which the method of the present invention can be played.
Figure 3:
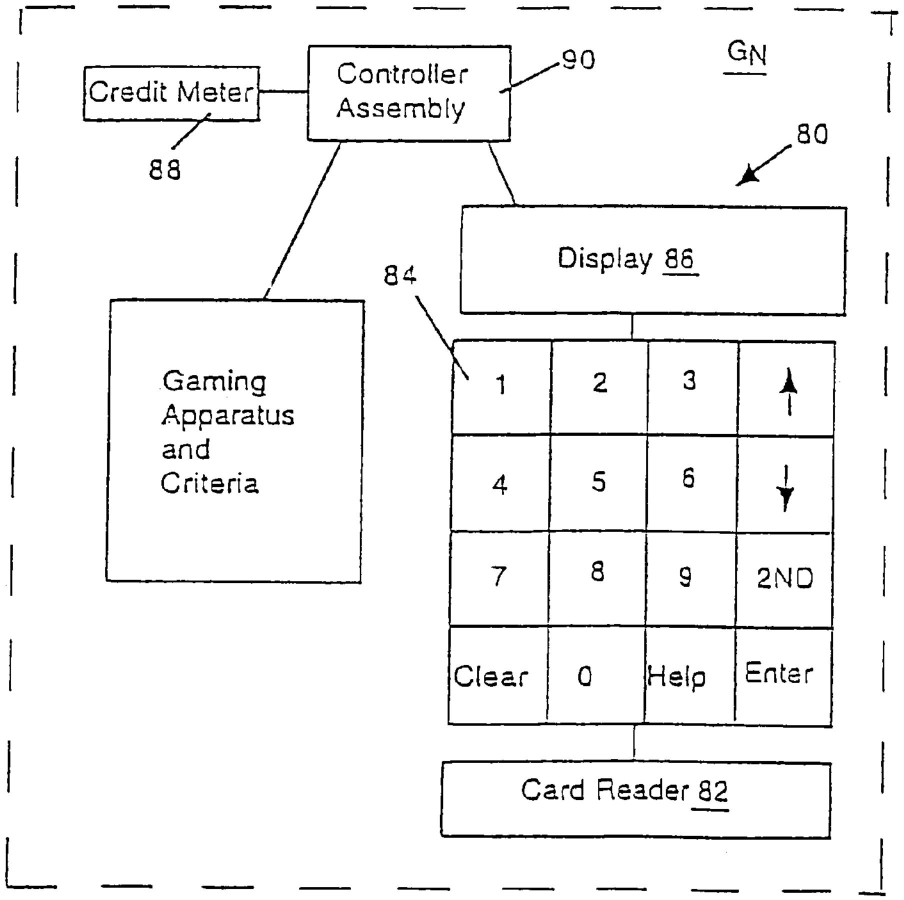
FIG. 3 is a schematic depiction of the gaming machine including the card reader device according to one form of the present invention.

In essence, and referring to FIG. 1 through 3, the cashless gaming system 10 includes a real-time gaming account wagering system 20 operatively coupled to, inter alia, an enrollment station 40, a real-time accounting and game information system 60 and a plurality of gaming machines $G_1, G_2 \ldots G_N$, for example, electronic slot machines. Each gaming machine $G_N$ includes a controller assembly 90 and a card reader assembly 80 operatively coupled to the real-time gaming account wagering system 20. The card reader assembly 80 includes a card reading means 82, a keypad 84 and a display means 86.

At the outset, the player establishes an electronic account at the enrollment station 40 by selecting a personal identification number (PIN), depositing funds to an electronic account and receiving a player card which allows the player to access the real-time gaming account wagering system 20 directly from any gaming machine $G_N$.

Next, the player approaches any gaming machine $G_N$ and inserts the player card into the card reader 82 and is prompted, via the display 86, to enter the associated PIN to the account wagering system 20 via the keypad 84. Once the PIN is verified by the account wagering system 20 an option menu is displayed to the player on the display means 86. The menu includes options which allow the player to review his/her electronic account balance, download a player selected amount of funds, up to all of the funds from the account to the gaming machine $G_N$ (receive funds), upload a player selected amount of credits from the gaming machine $G_N$ to the electronic account (return funds) and convert player's points to credits which may be downloaded to the gaming machine $G_N$. A casino may also deposit promotional credits to the player's electronic account for marketing purposes. Any downloaded funds are preferably displayed on a credit meter 88 of the gaming machine $G_N$ for cashless wagering and the player status is updated by the wagering system 20 in real-time as a function of player wagering activity. The account wagering system 20 preferably uses the Windows 95 graphical user interface and Delphi programming language.

Figure 4:
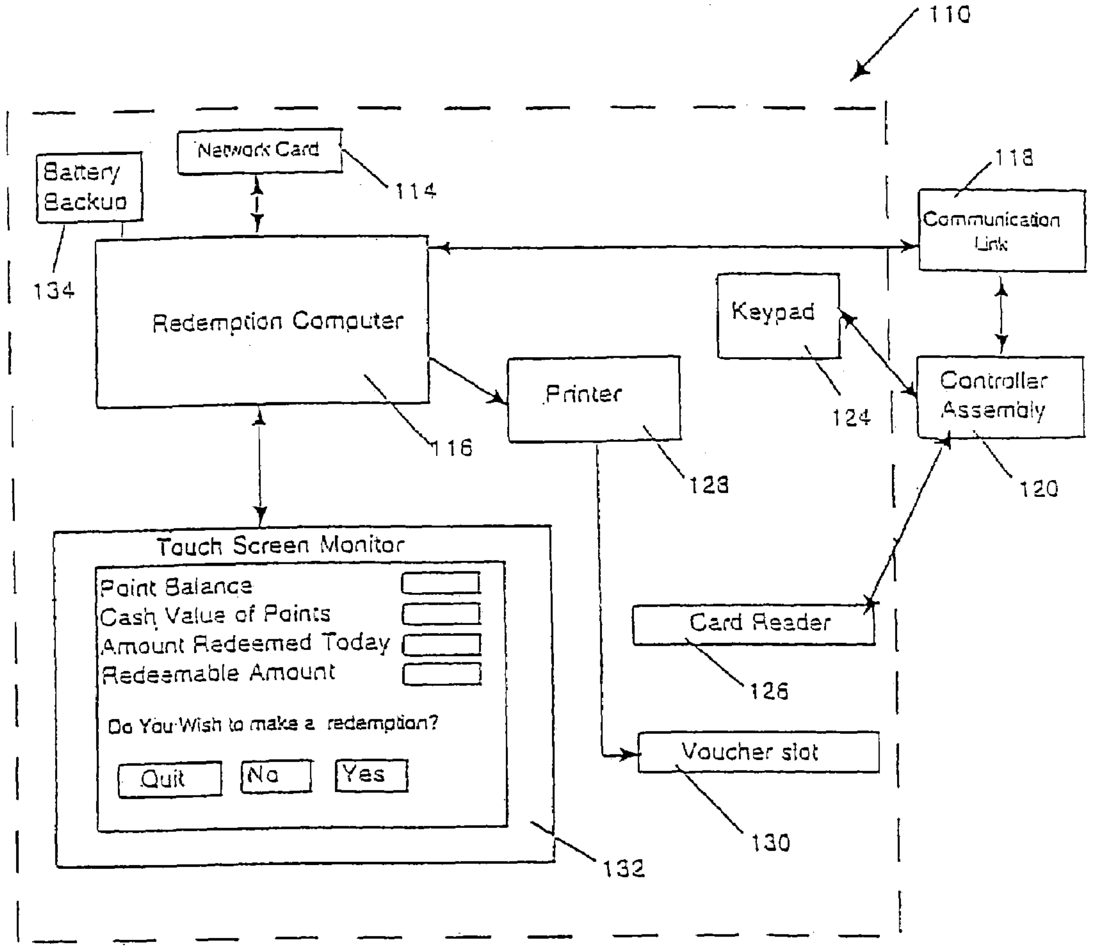
FIG. 4 is a schematic depiction of a redemption apparatus according to the present invention.
Figure 4A:
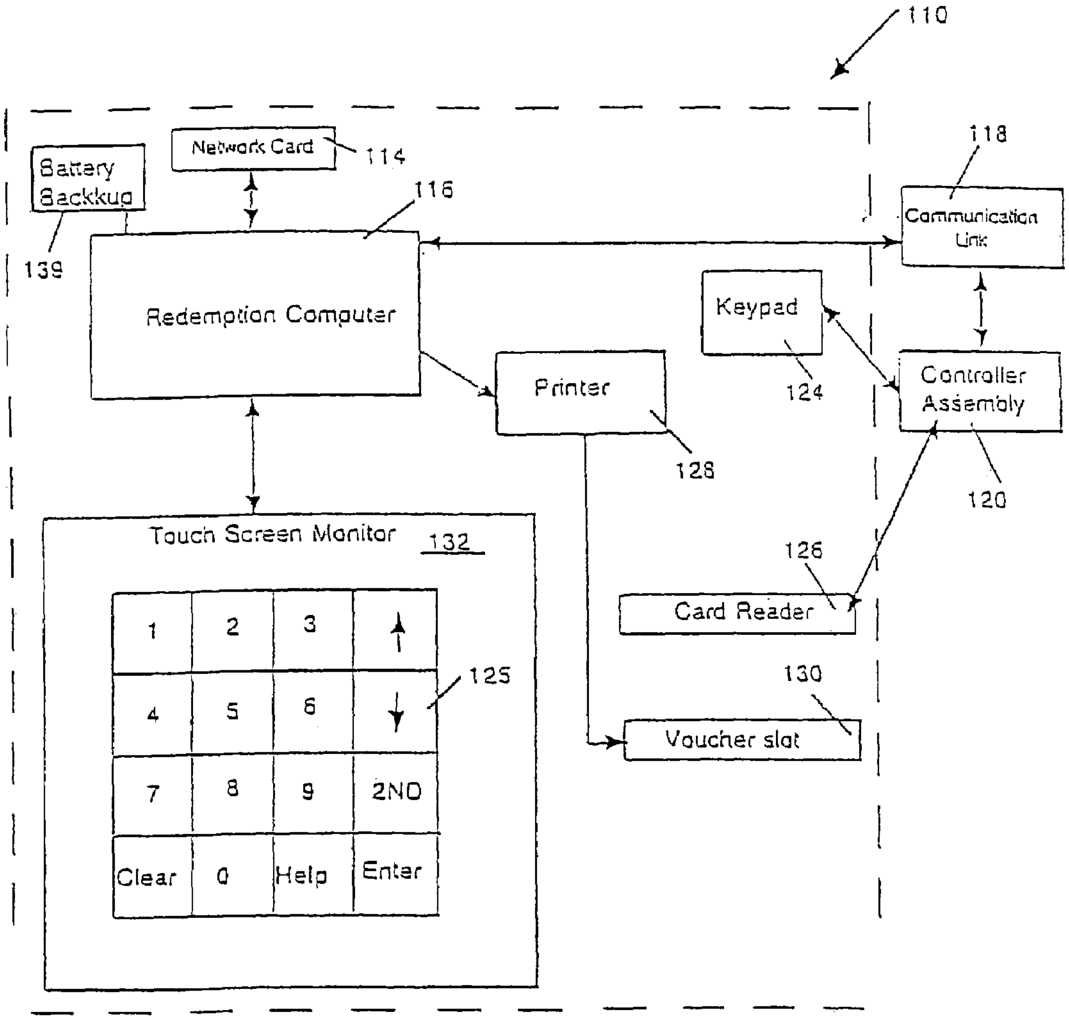
FIG. 4A is a schematic depiction of the redemption apparatus showing a graphical keypad on a touch screen monitor.

In addition, and referring to FIG. 4, the cashless gaming system 10 includes a redemption apparatus 110 having a real-time connection to the account wagering system 20 and to the accounting and game information system 60. Preferably, the redemption apparatus 110 is a free standing super structure which is presented to players on the casino floor and includes a touch screen interface 132 providing means for a player to access available account balance including promotional balance with the player card and redeem the player balance for cash and/or perquisite vouchers which are directly printed and distributed by the redemption apparatus 110.

Specifically, and referring to FIG. 1, the cashless gaming system 10, is comprised of the real-time gaming account wagering system 20 operatively coupled to the real-time or on-line accounting and game information system 60 and the redemption apparatus 110. The accounting and game information system 60 preferably includes a player database 62, a player tracking module 64 and a pit, cage and credit system 66. In addition, the account wagering system 20 is operatively coupled to at least one enrollment station 40.

///

Enrollment Station Configuration

Referring to FIG. 1, each enrollment station 40 is preferably set up in a restricted area of a casino or the like. This station 40 is preferably located in an area having control over cash and electronic account cash equivalents (e.g. casino cage, controlled club workstation, etc.). The enrollment station 40 includes a workstation computer 42, a controller assembly 44, a card reader 46, a keypad 48 and a display 50. The workstation computer 42 is operatively coupled to the real-time gaming account wagering system 20 and the on-line accounting and game information system 60. The card reader 46, the keypad 48 and the display 50 are coupled to the workstation computer 42 via the controller assembly 44. One example of the controller assembly 44 and 90 is commercially available under the name "Sentinel® II" manufactured by applicant.

Enrollment station configurations may vary from casino to casino and also within a single casino. A single cashier utilizing a single workstation computer 42 can perform accurate wagering system transactions out of a single cash drawer 52. Multiple cashiers utilizing a single workstation can perform transactions out of single or multiple drawers. For configurations of single cashier/single workstation/single drawer, the user can log on to the system 20 and not be required to enter their password again to process account wagering system transactions. For multiple user configurations, the account wagering system 20 may require a password for each transaction processed through the enrollment station 40. This enables the transactions to be segregated for cashier identification and accountability.

Opening an Electronic Account and Player Account Functions

Figure 5:
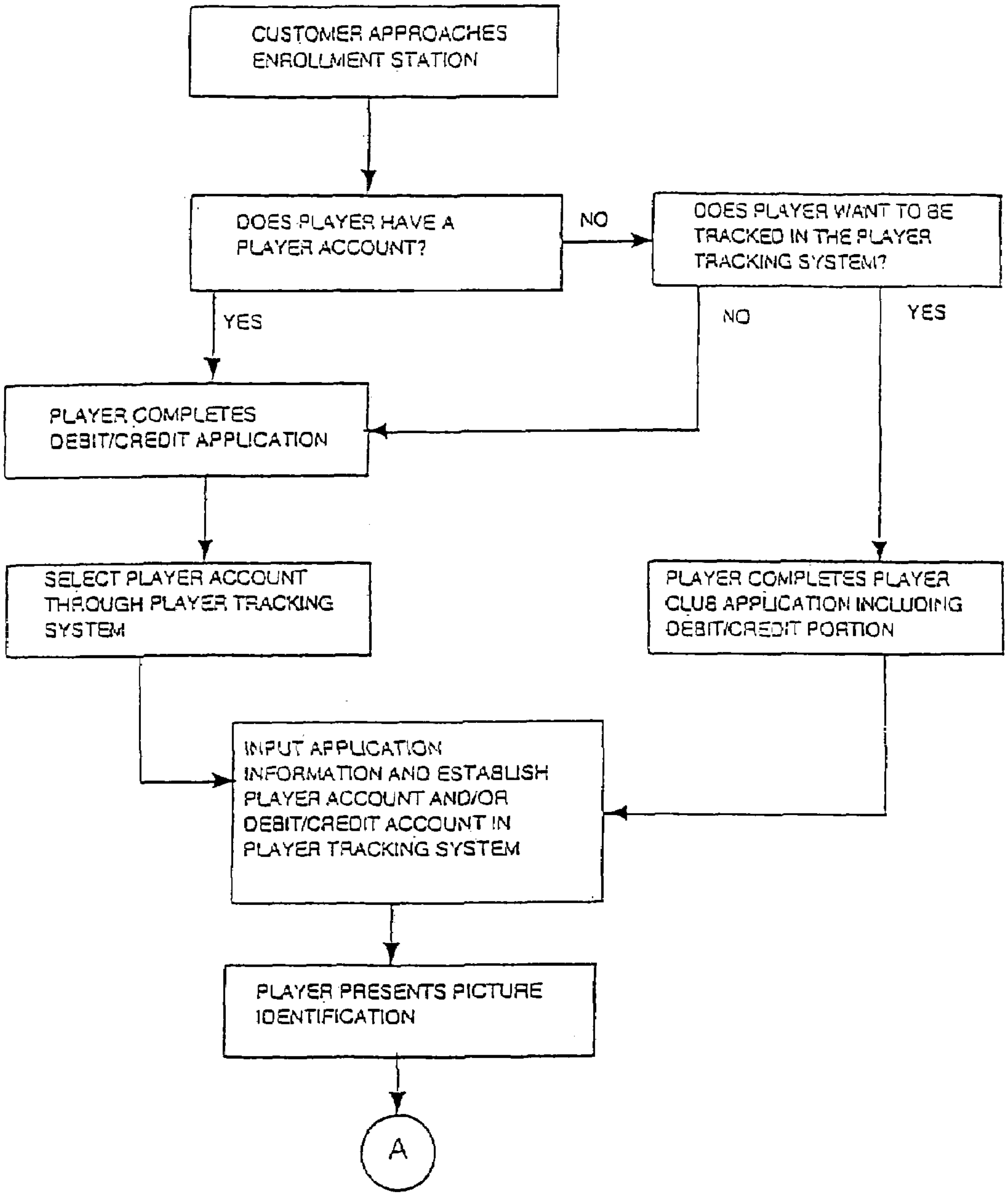
FIGS. 5, 6, 7 and 8 are flow diagrams of the method of playing the cashless gaming system according to the present invention.

Referring to FIG. 5, a player opens an electronic account at any enrollment station 40 by completing an application with the required information and presenting it to a designated casino employee such as a cashier for input into the account wagering system 20 and player database 62 of the system 10. The player will then receive a player card for enabling any of the gaming machines $G_1, G_2, \ldots G_N$.

More specifically, the cashier will log onto the real-time gaming account wagering system 20 and access a player button or like which is associated with the workstation computer 42.

A select player/group screen appears on a monitor of the computer 42 for the functions add account, display account, player pin, player deposits/withdrawals, etc. where a player or group must be specified. The select player/group screen will utilize a user interface and access the player database 62. One example of the user interface and the pit, cage and credit system 66 is commercially available under the name "PITBOSS" manufactured by applicant. Player selection can be accomplished using the user interface to access the various fields available on the select player/group screen. The screen preferably provides a filter for players, groups, or both to be viewed based upon the search criteria. The fields preferably include:

1. Player/group name (full and partial search)
2. Player social security number
3. Player/group ID
4. Card ID (key input or card insertion)
5. Account ID
6. Group contact
7. Player nickname (secondary search criteria)
8. Player birthday (secondary search criteria)
9. Player state (secondary search criteria)

The select player/group screen will provide a list of player and/or group matching the criteria input into the above fields as well as additional information on the highlighted player/group. For selection fields including complete information, the system 10 will proceed from the select player/group screen to the requested function screen and default any known information about the player or group to the appropriate fields. If the requested account is not found in the database 62, an Add button is preferably available on the select player/group screen to take the user directly to an add account screen Add Account Two types of accounts can be added to the system 10. The first type of account is an individual player(s) account. This account can have a plurality of people associated with it. The system 10 monitors plays individually for personal information and game statistics and preferably monitors the account as one entity. The system 10 provides the ability to have two players accessing a single account and a single account's funds. If players prefer to restrict access to one individual, separate accounts can be established.

The second type of account is a group account. This account allows the casino to group multiple permanent and temporary player cards together as a group. One purpose of the group account is to deposit a predetermined amount of promotional dollars to each account for use in the casino's gaming machines only. The balances associated with permanent accounts will segregate promotional dollars from other types of deposits. A list of available groups will be presented on the screen. One group can be selected from this screen.

The add account screen for a player preferably includes the following information:

1. Player name (provided by the player database 62)
2. Player street address (provided by the player database 62)
3. Player city and state (provided by the player database 62)
4. Player account number (provided by player database 62)
5. Player identification with ID number, expiration and state/country The add account screen for a group will include the following information:

1. Group name (provided by the player database 62)
2. Group city and state (provided by the player database 62
3. Group ID number (provided by the player database 62)
4. Group beginning date (provided by the player database 62)
5. Group ending date (provided by the player database 62)

Fields furnished by the system 10 are preferably not editable through the workstation computer 42 except by authorized users. The player identification (e.g., driver's license, passport, etc.) will be entered through this screen.

Once the cashier has entered the applicable information, two task button means are preferably available on the add account screen. This first button is a PIN button to allow the player to establish his PIN at the time of account set up. This will also be more efficient for the cashier since the function is accessible directly from the add account screen. The second button is a deposit button to allow funds to be immediately deposited to the newly-established account. This also will be more efficient for the cashier since the first transaction after adding the player will normally be to deposit funds so the account can be used.

Once the player/group is added to the system 10, and the associated PIN and deposits are completed, the cashier will exit the add account screen. If a player's PIN is not entered through the add account screen, the system should provide a notification window and require the user to confirm that the PIN was not established.

Establishing or Changing a Player PIN

Figure 6:
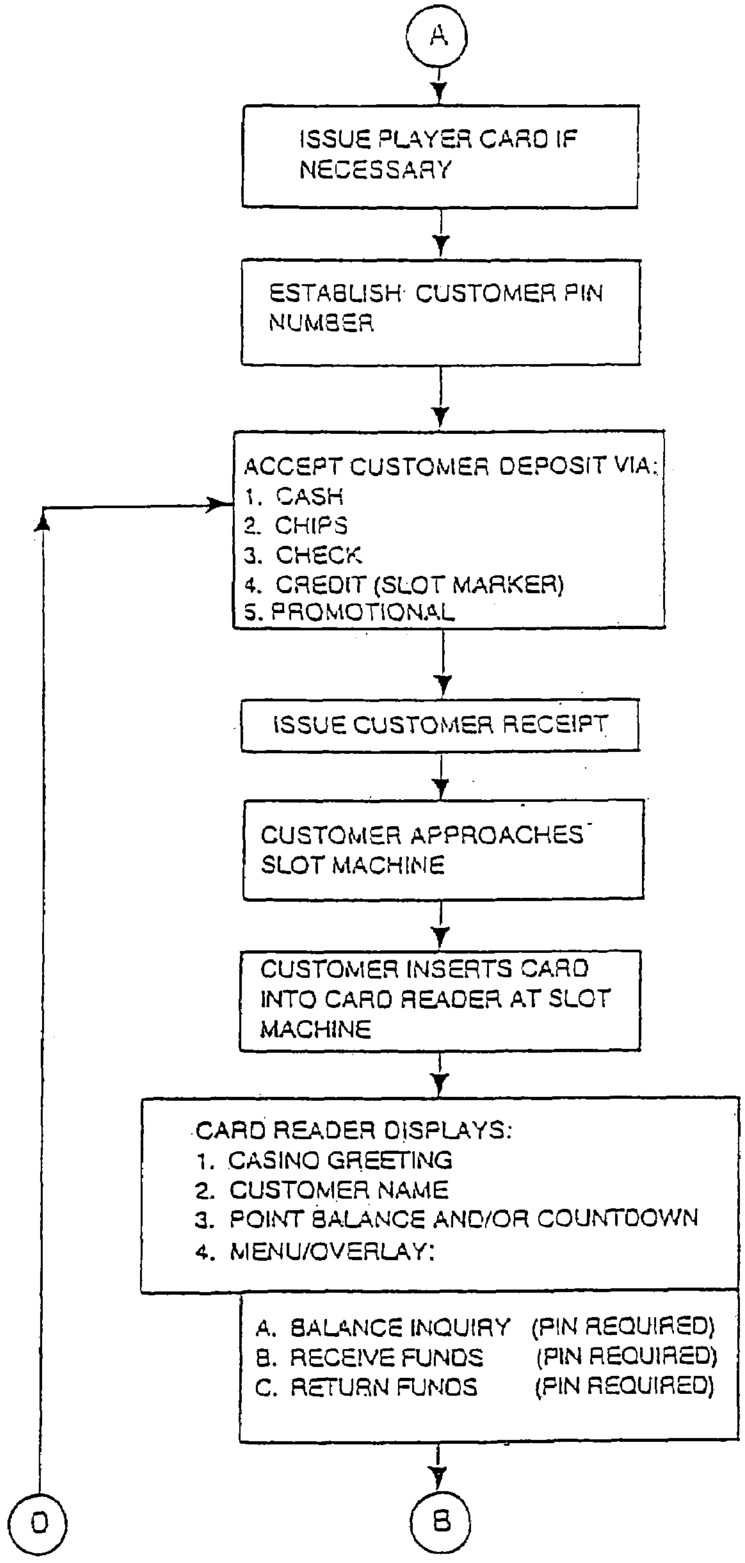

Referring to FIG. 6, the player establishes or changes his PIN at any enrollment station 40. The establishment of the PIN is usually performed when the account is set up. Changing a PIN can be performed at any time subsequent to the account set up. Establishing and changing personal identification numbers is preferably always be performed at an authorized station 40 with appropriate player identification. When the player requests to establish or change his PIN, the cashier will access the player's account. The PIN can be established or changed through the add account screen or a player pin screen. The add account screen has a task button that will take the user to the player pin screen when adding a player account. If the player wishes to change his PIN, the function can be accessed directly through a player pin menu option.

The player pin screen activates an enrollment controller assembly 44 operatively coupled to a card reader 46, keypad 48 and display 50 to allow a player to enter or change his PIN. Preferably the player does not see the cashier's enrollment station computer screen. The display 50 will guide the player through the PIN process with the cashier verifying the proper input from the workstation screen. Anything input through the card reader keypad 48 will be reflected on the card reader display 50 preferably as asterisks. The cashier's workstation screen will receive the player's input each time the enter button is pressed on the keypad 48. All PIN input will be secured at the card reader 46 and the station 40 by the use of asterisks. The controller assembly 44, and display 50 can also be utilized by the cashier to show the player the menus he will see when performing system transactions at any gaming machine $G_N$.

If the player is establishing the PIN for the first time, the screen will ask the player for a four digit PIN number to be entered and then a verification of the PIN number to be entered. When the PIN number is being changed, the screen will ask for the old PIN number to be entered, the new PIN number to be entered, and the new PIN number to be verified. If a player forgets his PIN, a new PIN will be established for the player by an authorized user preferably independent of the enrollment station 40. To establish the new PIN, the cashier will select an override option in the account wagering system menu. The user authorized to override the PIN will insert his card into the card reader 46. The account wagering system 20 will ignore the player's old PIN and proceed to the new PIN procedures described above.

The cashier's enrollment station screen should mirror the movement of the player using the keypad 48. When the player completes the input of the number, the cashier will post the transaction through the enrollment station 40.

Enrollment Station Deposit Functions

Once the player/group has established an electronic account in the system 10, funds are deposited to the account. The following is a discussion which pertains to deposits through the cashier at the station 40. When a deposit button is selected, the system 10 will prompt the user to select the type of deposit transaction desired: normal, manual, point or void. Once the type of deposit is selected, the system 10 will prompt the user with the select player/group screen. Once an account is selected, a deposit selection screen is accessed (please see FIG. 6). For normal or manual deposits, the deposit selection screen lists types of deposits available though the system as follows:

1. Cash/chips
2. Checks
3. Markers
4. Promotional

All types of deposits are available for player transactions, however, promotional deposits are preferably only available for group transactions. Permanent card holders who also have electronic wagering accounts can have promotional credits deposited to their accounts through the group function but uses a player deposit function for other deposit types.

For all system deposits, the following fields are preferably displayed in addition to the specific fields for each type of deposit:

1. Player/group name
2. Player/group account
3. Player/group account status
4. Player/group account balances:
   a. Cash/chip balance by denomination
   b. Check balance
   c. Marker balance
   d. Player point balance with cash equivalent (if applicable)
   e. Promotional balances (individual player balance and group total balance)
5. History of account transactions
   a. Date
   b. Time
   c. Location of transaction (e.g. cage, gaming machine, etc.)
   d. Amount of transaction (if applicable)
   e. Type of transaction (e.g. deposit, withdrawal, point conversion, change PIN, etc.)
   f. Employee identification for transaction (cage) or player identification (gaming machine)

When a cash and/or chip deposit is processed, the screen preferably includes the following:

1. Individual cash denomination fields of $1, $2, $5, $10, $20, $50, $100, $500, $1000 or other denominations.
2. Chip/token amount
3. Coin amount The dollar amount of each currency denomination and chip/token will be input into the appropriate field. Logic is presented to calculate inconsistent amounts. Currency is entered by denomination for Regulation 6A and Title 31 (money laundering) purposes. A total and subtotal deposit field should be displayed indicating the cumulative total of cash, chips/tokens and coin input.

For check deposit processing, the screen preferably includes:

1. Check date
2. Check number
3. Total check amount
4. Amount of check deposit
5. Check cashing authorizer (from the pit, cage and credit system 66)

For marker deposit processing, the screen preferably includes:

1. Marker date
2. Marker number
3. Total marker amount
4. Amount of marker deposit
5. Marker authorizer (from the pit, cage and credit system)

The check deposit and marker deposit screens should provide the ability to deposit multiple checks and markers. All procedures for proper check cashing and marker issuance (i.e., credit application, available credit line, etc.) are controlled by the pit, cage and credit system 66. The pit, cage and credit system 66 allows for full and partial check and marker deposits.

If a check or marker is returned for nonpayment, the account wagering system check and marker available balances, respectively, should be reduced by the amount of the related document. If a marker payment is received, the available marker balance is increased Account balances shown to the player at any gaming machine $G_N$ include all marker and check transactions.

Promotional value can also be deposited to a player or group account. The promotional deposits screen preferably includes:

1. Promotional dollar value to be added to the account(s)
2. Date the promotional value is valid
3. Date the promotional value expires
4. Promotional value authorizer The promotional dollars will be available inclusively from the beginning date to the ending date of the group trip. Once the ending date passes, the promotional dollars are no longer available and the account wagering system 20 documents the expiration in an exception report.

When a done button is selected on any of the deposit screens, the user will be returned to the deposit selection screen. The cashier can then select another type of deposit, if applicable, and a single deposit receipt can be printed for multiple types of deposits. All deposit receipts should document the details of any deposit. The receipt should also have four signature lines with configurable labels. The first signature line is for the player, the second signature line is for the cashier, the third and fourth signature lines vary by casino as to the position that signs.

The deposit receipt is preferably formatted by the system 10 with the following information:

1. Player name
2. Player account
3. Document number
4. Date
5. Time
6. Shift
7. Cashier ID
8. Window ID
9. Type of deposit
10. Deposit details (number and amount of denominations of cash, chips, etc. (multiple lines))
11. Player signature
12. Cashier signature
13. Two additional signatures with configurable labels

///

///

Bonus Points and Point Conversion

The cashless gaming system 10 includes means for awarding bonus points directly to the player's electronic account based upon a wide variety of criteria. For example, bonus points and/or complimentaries may be awarded to the player based upon funds in, funds out, actual win statistics, theoretical win statistics, average bet, time played, game speed and player skill level. In addition, bonus points and/or complimentaries may be awarded to the player's electronic account based upon, for example, casino promotions. Typically, the casino determines the date and time for each promotion and the system 10 automatically starts and stops the promotion times.

When interacting with gaming machines, the display on the machine preferably shows the players current point level and the number of coins needed to get to the next point level. Over time, the players point total and complementary dollar balance may be increased based on their levels of play.

Points from the player tracking module 64 can be converted by the player at enrollment stations 40. In addition to the general deposit fields above, a points conversion screen preferably includes:

1. Total available points balance in dollars
2. Amount requested to be deposited to the player's account Point conversions preferably prints a deposit receipt with the same information including the points converted.

If the player chooses to convert points, the playing tracking module checks and updates files stored in the system 10. The system 20 sends the available points and dollar amounts to the controller assembly 90. The controller assembly 90 displays the dollar amount of available points on the keypad display 84. The player then requests a point conversion transfer in dollars. The controller assembly 90 performs range checking and sends the request to the system 20. The system 20 authorizes or denies the request. The system 20 authorizes the request, decrements points and writes the transaction to a file. If the controller assembly 90 or system 20 denies the request, a denial message is displayed on the keypad display 84. The account wagering system 20 confirms the point conversion deposit amount and sends confirmation to the controller assembly 90. The controller assembly 90 increments the credit meter 88 of the gaming machine for the dollar equivalent of points converted. The real-time gaming account wagering system 20 documents the details of the conversion.

Manual Operation for Deposits

During system 20 downtime, manual deposits will be processed using casino manual procedures while preferably following these fields:

1. Deposit slip number
2. Deposit date
3. Deposit time
4. Deposit shift

Void Functions

If a deposit is made in error, the deposit slip and transaction must be voided and reprocessed. When a Void screen is selected, a list of deposits processed by the current logged in user will be displayed. An individual authorized to void deposit transactions will select the deposit to be voided. The user actuates a void button and the deposit is voided from the system 10. User authorization is entered prior to posting the transaction. When a transaction is voided, the document/transaction number is not reused for the next transaction. Auditing accounts for all transactions and documents so the sequential number will advance for the corrected transaction.

Gaming Machine Deposit Functions

Figure 7:
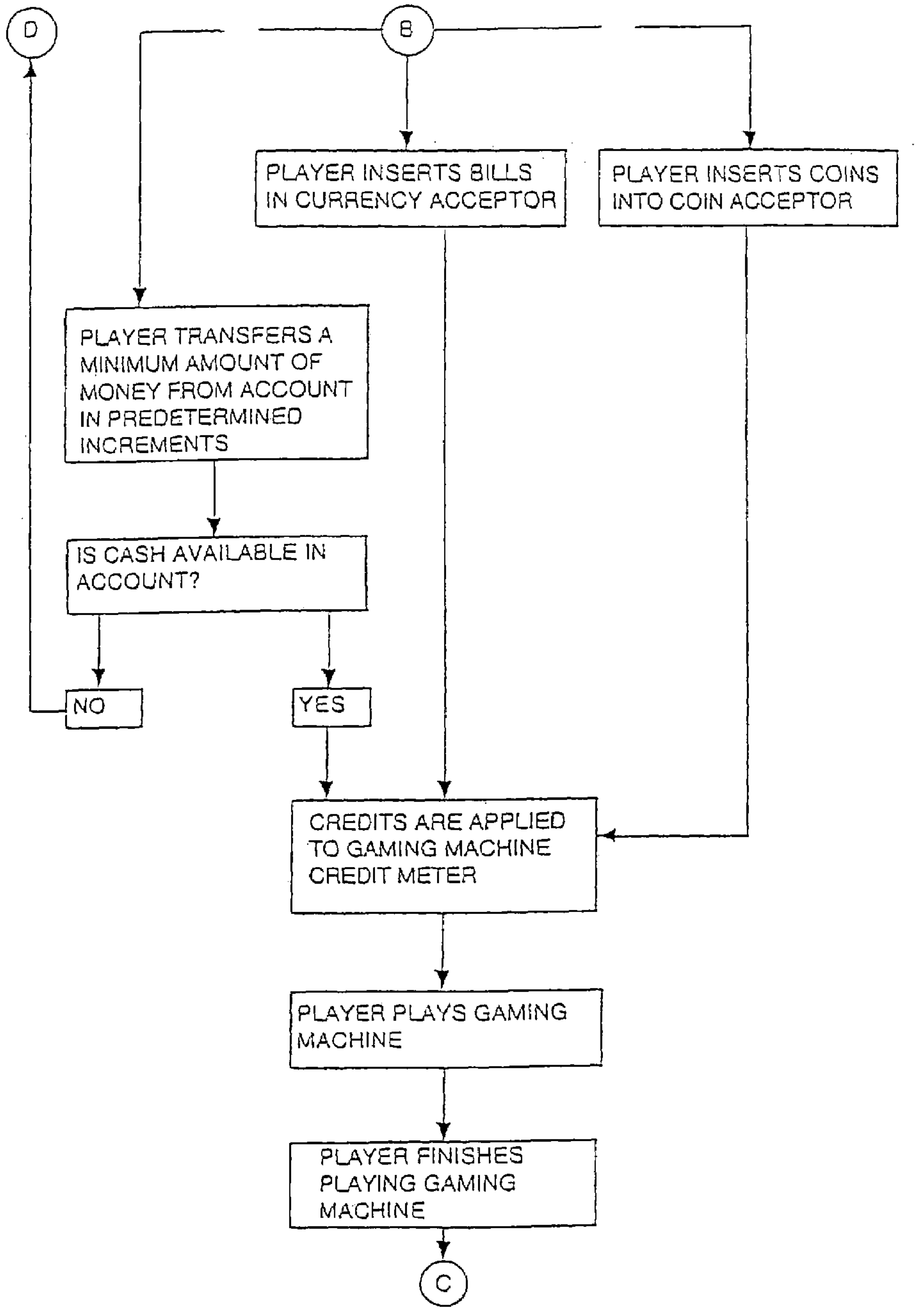

Referring to FIG. 7, the player can deposit funds to his electronic account from any gaming machine $G_N$ by directly inserting coins or bills into the respective machine acceptors 102, 104. Any transfer from the gaming machine's credit meter 88 can include credits that were not originally in the player's account and can include up to all of the total credits on the credit meter 88.

The machine controller assembly 90 keeps track of what types of credits comprise the total number of credits on the credit meter 88. Credits are removed from the credit meter 88 for machine play in the following order:

1. Cash (bill and coin acceptor) credits
2. Winning credits
3. Promotional credits
4. Account credits (includes point conversions)

Promotional and winning credits can be deposited from the gaming machines $G_N$ and posted to the electronic account with no restrictions. If a bill is accepted through the bill acceptor 102, the controller will send, to the system 10 the count of all bills inserted into the acceptor 92 for all denominations each time a transfer is processed to the electronic account. If the credit meter 88 returns to zero and no player card 100 is inserted into the card reader 82, the meters for the bill count will be canceled. The deposit may be considered a restricted deposit through the gaming machine $G_N$ and should be posted to the system 10 by denomination if it meets Regulation 6A and Title 31 criteria:. Each transfer from machine $G_N$ will be evaluated for new amounts to be posted as restricted or non-restricted deposits to the electronic account.

Display Account

A display account screen preferably includes all of the information described above in the add account screen with the following additional fields:

1. Player account status
2. Player account balances:
   a. Cash/chip balance by denomination
   b. Check balance
   c. Marker balance
   d. Player point balance with cash equivalent (if applicable)
   e. Promotional balances (individual player balance and group total balance)
3. History of account transactions (provide recent history and complete history):
   a. Date
   b. Time
   c. Location of transaction (e.g. cage, gaming machine, etc.)
   d. Amount of transaction (if applicable)
   e. Type of transaction (e.g. deposit, withdrawal, point conversion, change PIN, etc.)
   f. Employee identification for transaction (cage) or player identification (gaming machine)

For displaying the group accounts, the following fields are preferably displayed in addition to the add account fields above:

1. Group account status
2. Group account balances:
   a. Individual player's promotional balances
   b. Group's total promotional balances
3. History of account transactions:
   a. Date
   b. Time
   c. Location of transaction (e.g. cage, gaming machine, etc.).
   d. Amount of transaction (if applicable)
   e. Type of transaction (e.g. deposit, withdrawal, point conversion, change PIN, etc.)
   f. Employee identification for transaction (cage) or player identification (gaming machine)

In addition, an edit button is preferably provided for editing information previously entered into the system 10 via the add account screen. The edit button and database information should be accessible by authorized personnel only.

Account Status

Player's electronic accounts can have several statuses. The most common status is an active status. This means the player's account is in good standing and has no problems. The account should also be allowed to have inactive, suspended, and hold statuses. Any status other than an active status does not allow the player to access the account without first contacting casino personnel at the enrollment station 40. The account should still be accessible through a station 40 for authorized users.

An inactive account is an account that has not been accessed either by the player or casino for an amount of time configurable by the casino. A suspended account denies access to the player due to problems associated with the account. Examples of reasons for suspending an account are non-payment of markers, fraudulent activity, etc. The suspension of an account requires the player to perform transactions through authorized personnel until the problems with the account are resolved.

A hold status is used when the casino needs to see the player for any reason prior to the player accessing the account. Examples of reasons to place an account on hold are when a player applies for an account through the mail and the casino needs to verify the player's identity prior to activating the account, system transaction acknowledgment errors for transfers of money, etc. All account statuses should be capable of being changed manually by the casino.

Enrollment Station Withdraw Functions

Normal Withdrawals

Withdrawals from an account are performed at the enrollment stations 40. When a player requests a withdrawal from his account, a cashier will access the player's account via the select player/group screen. Once the player account is selected, a withdraw screen preferably displays the following information:

1. Player name
2. Player account
3. Player account status
4. Player account balances:
   a. Cash/chip balance by denomination
   b. Check balance
   c. Marker balance
   d. Player point balance with cash equivalent (if applicable)
   e. Promotional balances (individual player balance)
5. History of account transactions
   a. Date
   b. Time
   c. Location of transaction (e.g., cage, gaming machine, etc.)
   d. Amount of transaction (if applicable)
   e. Type of transaction (e.g., deposit, withdrawal, point conversion, change PIN, etc.)
   f. Employee identification for transaction (cage) or player identification
6. Total available balance
7. Total outstanding marker balance
8. Total checks returned balance
9. Total deposits
10. Total withdrawals
11. Total point conversion dollar amount
12. Funds available for withdrawal:
    a. Restricted list by denomination
    b. Non-restricted list in total The withdrawal screen will show the cashier the restricted funds required to be given in specific denominations to the player. The screen should display entry fields next to the available denominations and totals for the cashier to input the amounts withdrawn. Account funds will be utilized for withdrawals in the following order:

1. Unrestricted cash including checks and winnings
2. Restricted cash (smallest denomination first)
3. Markers The withdrawal receipt is preferably formatted as a receipt with the following information:

1. Player name
2. Player account number
3. Document number
4. Date
5. Time
6. Shift
7. Cashier ID
9. Type of withdrawal
10. Withdrawal details (number an amount of denominations of cash, chips, etc.—multiple lines)
11. Player signature
12. Cashier signature
13. Two additional signatures with configurable labels.

Withdrawals can be processed for the full balance of the account or a partial balance of the account.

///
///

Manual Withdrawals

During system downtime, manual withdrawals will be processed. Manual withdrawals include withdrawals at the enrollment station 40 and withdrawals at the gaming machines $G_N$ (credit meter payouts). Enrollment station 40 withdrawals will be processed using the casino's manual procedures and the player's account balance will be reduced. Gaming machine withdrawal documentation will be input to the account wagering system 20 to be audited by the system 10 against the messages input at the machine (see OTHER ISSUES below). Gaming machine withdrawals input at the station 40 will not reduce the player's account balance since the controller 44 will send the withdrawal message when the system is operational. The documentation will however provide an audit trail for the casino if the player wishes to perform other transactions with his account. The manual screen is preferably formatted like the normal screen, and includes the additional following fields for input:

1. Withdrawal slip number
2. Withdrawal date
3. Withdrawal time
4. Withdrawal shift Void If a withdrawal is made in error, the withdrawal slip and transaction must be voided and reprocessed. The sequence number will advance for the corrected transaction and the procedures will be the same as explained for voided deposits above.

///
///

Markers and Checks

Markers and checks are accepted in the account wagering system 20 as valid deposits to accounts. Typically, markers are issued through the associated enrollment station 40 utilizing customary marker issuance procedures. Marker deposits include a full marker deposit and a partial marker deposit. The total marker and amount is input into the system 10 as a full marker deposit and a portion of the marker amount is given to the player and the remaining amount is deposited into the account wagering system 20 as a partial marker deposit.

The processes of using markers and cashing checks are performed through the pit, cage and credit system 66 and the markers and checks are manually input into the account wagering system 20 for tracking purposes. If a marker payment is received, a marker is returned for nonpayment or a check is returned for nonpayment, the system 10 must reflect the document payment or nonpayment. Payments of markers are processed as an increase in the available marker balance for access by the player. Returned markers and checks are shown as reductions in the available marker or check balances. Preferably, the system 10 allows a casino to improve their collection practices by alerting their staff to outstanding marker balances prior to a player's withdrawal from or closure of an electronic account.

Marker Payment

For marker payments, the cashier will access a balance button and select marker Payment. The actual station 40 marker document/receipt will provide the marker payment information to be input. The cashier will select the player's account and the system 10 will provide a list of outstanding markers. The list of outstanding markers will include:

1. Player name
2. Player account
3. Outstanding total marker balance
4. Marker date
5. Marker number
6. Marker amount
7. Marker authorizer (pit, cage credit system 66)
8. Marker balance (if applicable)

Markers are preferably listed most recent to least recent. The cashier will select the marker(s) to be paid and input the following information:

1. Marker payment date
2. Payment amount
3. Marker payment authorizer

Payments will increase the available marker balance as well as the total available balance for the player's account.

Marker payments are posted separately to the system 10. The ability of the player to withdraw his funds when there exists a marker balance is configurable by the casino. If account withdrawals are allowed with a marker balance, the system 10 will allow the patron to withdraw all funds in the account. A supervisory approval may be required for withdrawals over an amount configurable by the casino. If account withdrawals are not allowed with an outstanding marker balance, the system 10 will apply all account funds to the existing marker balance. If excess funds are available, the player may withdraw that amount. The system 10 will allow withdrawal of funds when an outstanding marker balance exists with proper authorization as an override of the normal procedure. When slot markers are consolidated in the enrollment station 40, the corresponding markers in the account wagering system 20 are consolidated.

Returned markers procedures are established by casino policy. The account wagering system 20 will allow the casino to configure the player's account to automatically become inactive when the system 10 is notified that a returned marker has been received by the casino.

A. W2-G reporting

B. System documentation

C. Cumulative reporting

Return Items

For returned items, the cashier will select between a marker and a check to process the return. The system 10 will provide a list of outstanding markers or checks based upon the cashier's selection. The cashier will select the marker or check to be returned and input the marker or check return date. The available balance for markers or checks and the total available balance for the account will be reduced by the amount of the return.

Write Off

For inactive accounts past a configurable time period, the accounts are preferably archived, the players notified and the liability of any unclaimed balances written off. The system 10 should archive all information regarding the account including the date and authorizer of the write off.

Cashier Functions

The cashier's drawer accountability is affected by the account wagering system transactions. In order for the cashier to balance his drawer 52 at the end of his shift, all of the account wagering transactions and their effect on the drawer 52 must be considered. A cashier button associated with the workstation computer 42 will provide a field for the cashier to input his ending cash drawer balance. The account wagering system 20 will then calculate a new ending balance based upon the transactions processed by the applicable user. A drawer accountability report will be produced through a reports button.

Reports Functions

The account wagering system 20 preferably provides extensive reporting capabilities. Below is a list of the reports provided:

1. User list with related system access capabilities
2. Exception list
3. Account history—detail and summary
4. Deposits listing
5. Withdrawals listing
6. New players listing
7. Group listing
8. Account balances listing
9. Marker payments listing
10. Returned item listing—markers and checks
11. Void transactions listing
12. Manual transactions listing
13. Open message listing (messages not acknowledged by the controller assembly).
14. System transaction listing—detail and summary
15. Cashier accountability
16. Written off accounts listing—detail and summary
17. System errors

///

Accounting Issues

Account wagering system transactions require an additional type of slot drop. In addition to the normal coin and currency slot drops, an account wagering system drop will be calculated. The drop is calculated as transfers to the machines $G_N$ net of transfers from the machines $G_N$. This drop will be added to the coin and currency drop in the accounting and game information system 60.

Additional meters to monitor account wagering system transfers are added to the system software. Two meters will track transfer to the gaming machines and transfers from the gaming machines. One meter will track the dollar amount of points converted to machines credits by game.

Other Issues

If there is no activity on the gaming machine $G_N$, the system 10 will detect a time out signal and automatically transfer the credits on the gaming machine to the player's account. In addition, the system will deactivate a player's account after a PIN is entered a predetermined number of times unsuccessfully (configurable field).

Abandoned Cards

Figure 8:
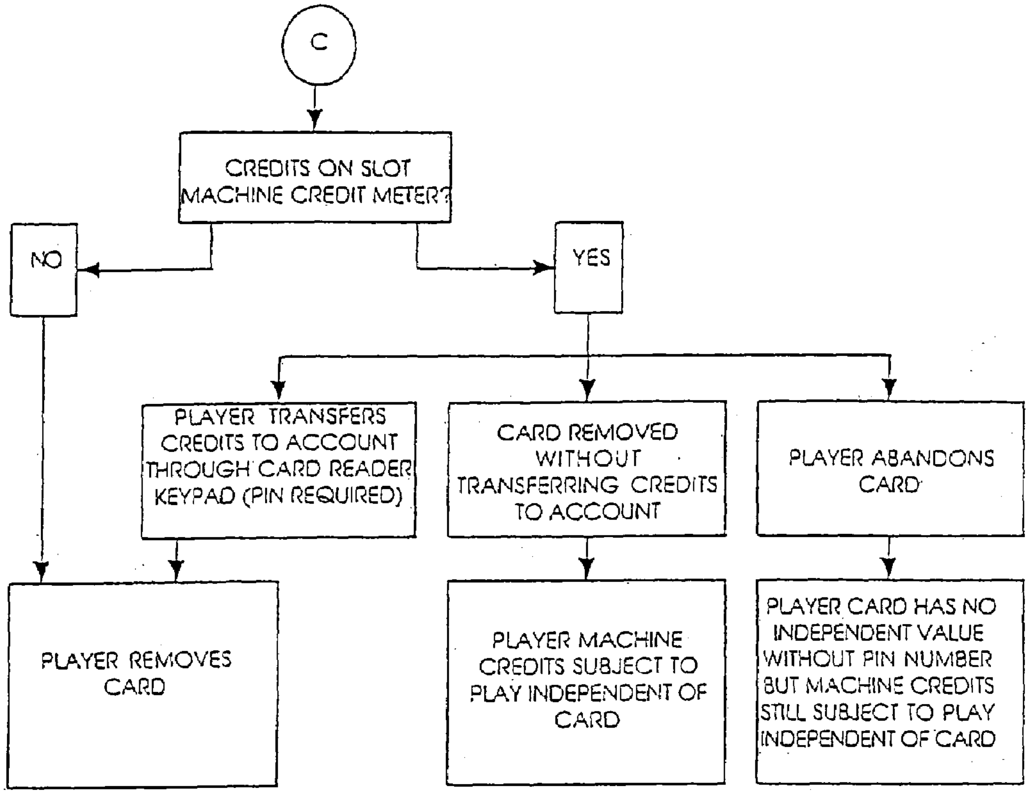

Referring to FIG. 8, when a player's card is left in the card reader 82 and no credits are on the machine $G_N$ the card has no independent value without the associated PIN number. If a player's card is left in the machine $G_N$ and there are credits on the credit meter 88, the player is preferably prompted to input his PIN in order to transfer the credits to the account. If another player attempts to play the machine $G_N$, the credits will be available for play, just as if the player had left non-account wagering system credits on the machine. However, not all account wagering system credits will be available for cashing out by the player.

In addition, if the player removes his player card without transferring credits to his account, the credits are subject to play independent of the player card.

Power Loss/System Failure

In the event of a power loss or system failure, the machine controller assembly 90 will display a system down message on the card reader display 86. The controller assembly 90 will maintain all account wagering system information. When power is restored, the machine resets the credit meter 88 and the on-line accounting and game information system meters 60 are reset by the system 20. All transfers to and from a player account require acknowledgments from the controller assembly 90 and the account wagering system 20.

Credit Meter Maximum

If the gaming machine credit meter 88 has reached the maximum number of credits, additional credits attempted to be added to the credit meter will be processed as follows:

1. Account wagering system credits—Requests for a transfer from the player's electronic account when the credit meter 88 has reached its maximum amount will be denied
2. Bill acceptor credits—Procedures determined by the gaming machine manufacturer.
3. Winning credits—Procedures determined by the gaming machine manufacturer.

Transfer Parameters

Transfers from the player's electronic account to the gaming machine $G_N$ may be subject to a minimum amount. An amount less than the minimum transfer amount is allowed only if the balance in the account is less than the minimum transfer amount (e.g., $1.00 minimum transfer amount and an account wagering system account balance of $0.75). In these cases, the entire balance in the account will be transferred.

The controller assembly 90 confirms the game machine denomination each time a player's PIN is confirmed to prevent incorrect numbers of credits being placed on the gaming machine credit meter 88. Preferably, encryption of PINs and monetary amounts will be utilized at all levels of the hardware and software.

Redemption Apparatus

Figure 4B:
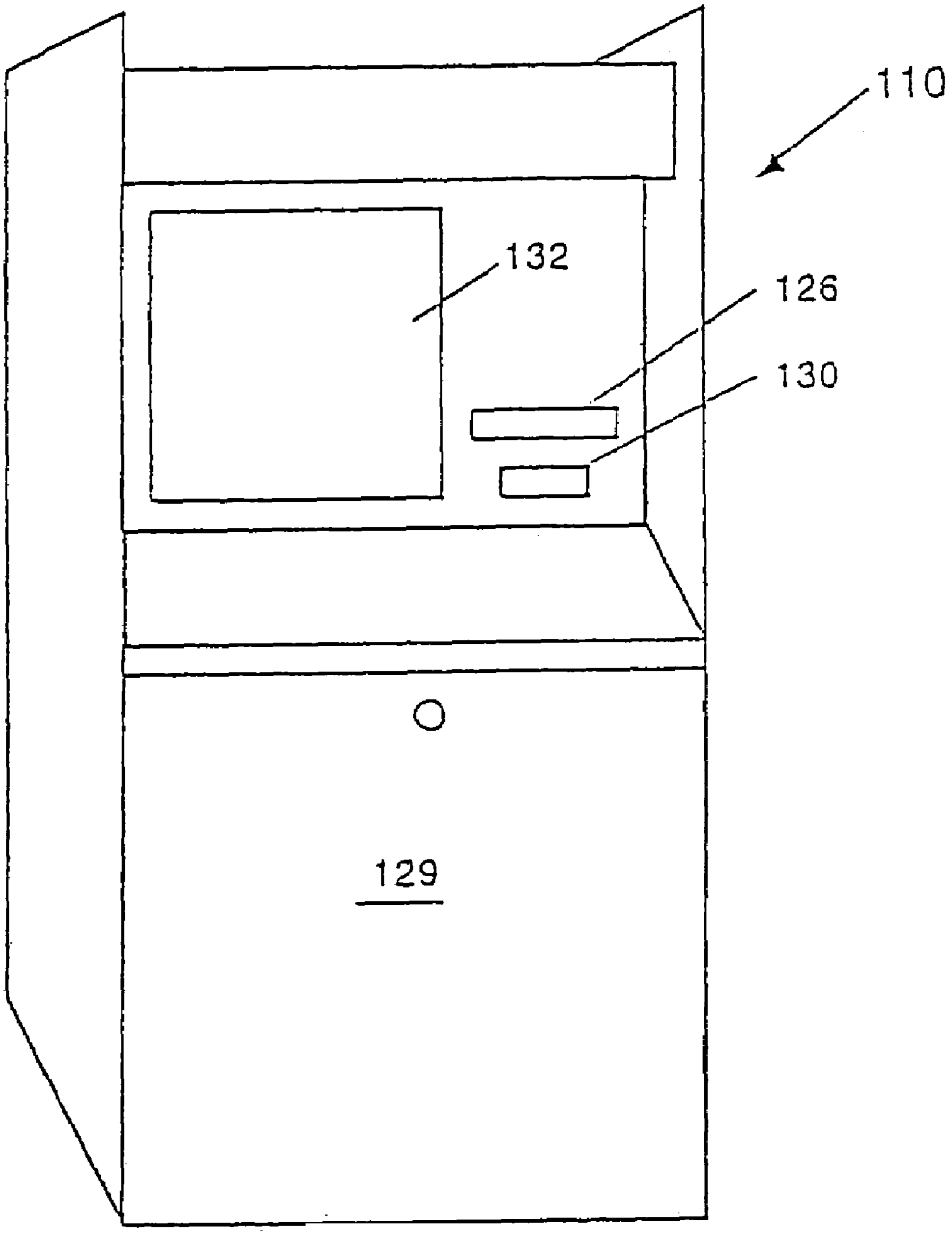
FIG. 4B is an elevational view of the redemption apparatus according to the present invention.

Referring to FIGS. 4 through 4B, the redemption apparatus 110 includes a network card 114 and a redemption computer 116 operatively coupled thereto. The network card is operatively coupled to the real-time gaming account wagering system 20 and the on-line accounting and gaming information system 60. Thus, player's information is updated in real-time, since the systems 20 and 60 are linked to both the gaming machines $G_N$ and to table games.

In addition, the redemption apparatus 110 includes a card reader 126 operatively coupled to a physical keypad 124 which in turn is linked to the redemption computer 116 via a controller assembly 120 and a communications link 118. The communication link 118 is required for protocol conversion. Furthermore, the redemption apparatus includes a printer 128, a touch screen monitor 132 and an optional battery backup 134 all operatively coupled to the redemption computer 116. The touch screen monitor allows players to easily interact with the apparatus 110 and the printer is used to print vouchers which are distributed to players via the voucher slot 130.

Referring to FIG. 4B, the redemption apparatus 110 includes a super structure unit 112 for supporting and enclosing the hardware delineated supra.

The redemption apparatus 110 allows players on the floor to access their point and comp dollar balances, and redeem these balances for cash and casino complimentaries at a plurality of locations throughout the casino. Specifically, players can redeem points for, cash up to for example, a daily limit or they can get vouchers for complimentaries such as food, beverage, rooms, gift shop items, etc.

The apparatus 110 is activated when a player touches an information button on the screen, or inserts their player's card into the machine's card reader 126. The player must enter their PIN at the redemption apparatus before any point or comp information is displayed on the screen. When the player redemption for cash or complimentaries, the redemption printer 128 prints a voucher for the specified amount and the voucher is distributed to the player via a voucher slot 130.

For cash redemption, players preferably select a whole dollar amount up to their entire balance or within an established daily redemption limits. Players may redeem their complimentary balances for meals by, for example, selecting the number of guests and the food outlet. Complimentaries can also be issued for other casino services, such as hotel rooms, lounges, or gift shops.

Since points and comp dollars can be earned for both gaming machine and table play, all casino players can use the redemption apparatus 110 to access their information.

Attractive multimedia video display and dynamic sounds are provided by using multimedia extensions thereby allowing the redemption apparatus 110 to display full-motion video animation's with sound to attract players to the terminal. During idle periods, the redemption apparatus displays a sequence of attraction messages in sight and sound. The videos are used to market specific areas of the casino and can be customized to any needs.

Each touch screen interface 132 presents large, attractive and easy-to-read graphics so that players will have no difficulty recognizing how to use the screen 132.

The system 10 includes security means for securing sensitive information. Each player has a Personal Identification Number (PIN) that is used to control access to redemption apparatus functions. Therefore, the player can only view and redeem points and comps after entering their PIN.

When a player completes the redemption process, the redemption apparatus 110 prints a voucher for the selected cash amount or complimentary item. This also provides a paper trail for auditing purposes.

In addition, the gaming machine $G_N$ includes an input output device, card reader 82, 126, for reception of a player memory card 140 such that the machine $G_N$ can read and write to. The invention also includes a separate stand alone station 110 where the player can take the player memory card 140 for a status diagnostic including the relative ranking of the player during the course of play or at the end of the set period for play including an opportunity to redeem awards associated with player performance.

More particularly, and with reference to FIG. 2, the gaming machine $G_N$ is shown according to one form of the invention. The machine $G_N$ includes a housing that supports therewithin, a display 86, an area for receiving a wager 102, 104, an input slit 82 to receive the player memory card 140, a window within the display 86 that allows supplemental information to be received thereon, a plurality of decision making buttons 103 and optionally a handle 83 which can be used in lieu of one of the decision making buttons 103 in order to initiate play of the game. In addition, a payout hopper 105 can be included for a redeeming awards based on play in using the machine $G_N$. The machine includes a random number generator G and a processor P.

Figure 10:
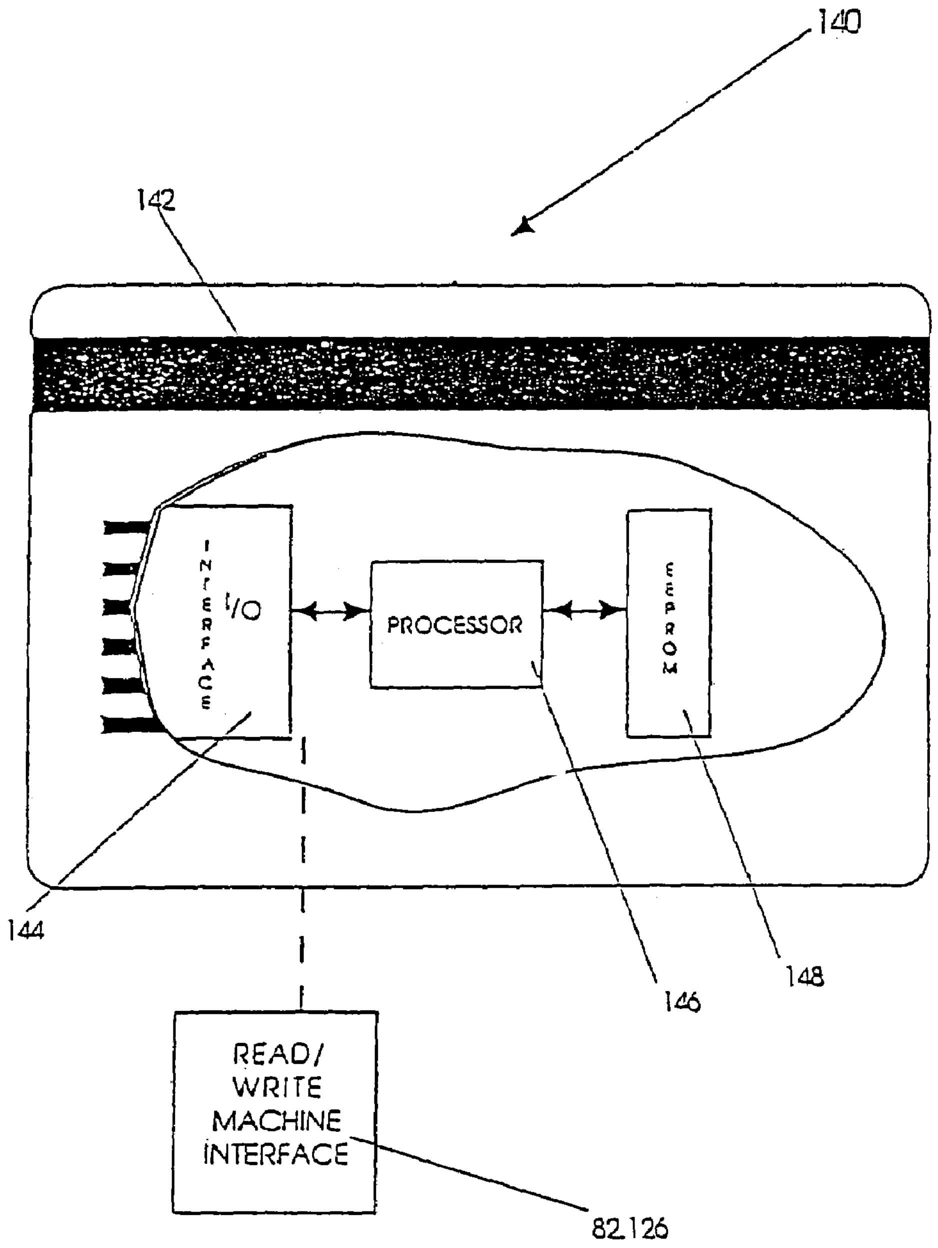
FIG. 10 is a drawing reflecting the interaction between a player memory card and a source of uploading and downloading.

FIG. 10 reflects details of the player memory card 140 and its relationship to a read write machine interface 82, 126 that receives the player memory card 140. More particularly, the player memory card 140 can be configured as a substantially planar rectangular piece of plastic which can include encoding on a magnetic strip 142 and includes an input output interface 144 that can be read by the read write machine interface 82, 126 shown in FIGS. 2 and 4. In essence, the input/output interface 144 is operatively coupled to an integrally formed processor 146 contained in the player memory card 140 and the processor 146 interfaces with an electrically erasable and programmable read only memory 148 so that the ongoing status of the player's gaming activities can be uploaded and downloaded to and from the memory card 140 to and from the machine $G_N$. The magnetic strip 142 can include other information if desired, such as player identification or a form of encryption for detecting the validity of the player memory card 140. In addition, the processor 146 and its memory 148 can be included with encryption or decoding means so that appropriate "handshaking" can occur between the machine interface and the card 140 to minimize the likelihood of cards which have been updated by an improper, unauthorized technique.

Referring to FIG. 4B, the redemption apparatus 110 is shown. The redemption apparatus 110 preferably includes a cabinet 129 which houses the display 132, an input 126 for receiving the player memory card 140 and an output 130 which distributes to the player an award. The output 130 can be in the form of redemption vouchers, scrip, currency or other indicia of value that the player can subsequently utilize or redeem. The display 132 provides the player with an update with respect to the progress the player is currently enjoying in the game associated with the player memory card 140 and can include ranking of the player vis-a-vis other people similarly competing in analogous games. Should the underlying game involvement be a tournament type play endeavor, that information can also be reflected on the display screen 132.

With respect to qualifying for redemption, the player first receives a player memory card 140 which can include a prompt pre-programmed therein either via the magnetic stripe 142 or from the memory 148 and processor 146 through input/output 144 that describes the game selected by the player. For example, assume the player initially decides to engage in a simulative baseball type game. The face of the card opposite that shown in FIG. 10 may depict a baseball environment. The card is accessible to the player at display racks located in the casino. The player may have the option of identifying himself at the redemption station (FIG. 4B) to initialize the game with an identity personal to the player but only at his sole discretion. This step is not necessary should the player decide to remain untracked. Next the player inserts the memory card which is downloaded into the machine $G_N$. The machine receives a signal from the card 140 announcing the type of game the player expects to play. Alternatively, and preferably the machine may be "single purpose" machines in which the player must take a baseball card and correlate it with a machine that is exclusively calibrated for baseball. In this preferred form, the machine $G_N$ includes baseball associated indicia. In all cases, the display 89 will display baseball correlative indicia on the display 89 to further provide correlation for the benefit of the player. Sounds evocative of baseball may emanate from a speaker or speakers 34 housed by the machine.

Upon receipt of the memory card and its having been downloaded through the read write interface, card reader 82, the machine prompts the player for a wager. Should the player decide to commence play, a wager is decremented from any credits that the player has posted via wagering input 102, 104 in conjunction with decision making buttons 103 and optionally with handle 83. The wager and the play continues resolving itself in an outcome that either qualifies the player for credit or not. Should credits not be due, the game progress is incremented (for example one out in the first inning becomes two outs). The player is again prompted for either a further wager or secession. Should the player qualify for a credit, the counter, such as the window 88 shown on the display 89 is incremented with respect to further game progress and the player is again then prompted for further wagering or to retire. Should the player elect to quit, the memory card 140 is updated and then returned to the player via the card reader 82.

For redemption, the keypad portion 84 of FIG. 2 may be used for effecting redemption which can occur either through the machine $G_N$ or preferably through a redemption apparatus 110 remote from the machine $G_N$. When the redemption is to occur at the machine $G_N$, the keypad is appropriately manipulated in order to provide the player with the earned benefits and the card 140 is returned after having been decremented based on any award due the player.

Considering FIG. 4B in detail, should there be a stand alone redemption area, the redemption apparatus 110 receives the card 140 of the player via card reader 126 and this information on the card is downloaded via a read write machine interface 126 such as the one shown in FIGS. 4B and 10. The interface 126 then actuates information to be displayed on the screen 132 and allows the player to receive an award through outlet 130. If the card status coincides with an award in which there are no residual benefits, an award is made and in one form of the invention the card can be retained by the machine. On the other hand, the bonus could be awarded with the card decremented and updated and returned to the player with an update so that any surplus remaining on the card can be utilized for further play by the player. If the player merely request a status report with respect to the player performance vis-a-vis other criteria, the update is provided on the screen 132 and then the card is returned to the player for further play. It could be that a game in progress has milestones that allows the performing player to receive incremental awards as a function of play. Thus, the portion which earns an award can be harvested by the player through outlet 130 as desired.

When the game simulation is baseball the player memory card should be capable of storing data at least with respect to the player's performance both by inning, by game, by season and by post season competition. In addition, pitching and batting performance for the player can be stored on the card for subsequent analysis to award benefits to the player as a function of having achieved milestones. For example, selection to an all star team during the course of the season may make the player eligible for bonus awards during an intermediate portion of the season. Similarly, most valuable player awards can be determined post season and during a play off. This information is stored on the player memory card at the end of each gaming session and is downloaded into the machine 10 prior to the next play by the player.

In Use and Operation

In use and operation, and referring to FIGS. 1 through 5, a player approaches an enrollment station 40 and completes a player club application including a debit/credit portion. In addition, the player is given the option of being tracked in the player tracking module 64. Next, a cashier at the enrollment station 40 enters the application information into the account wagering system 20 via the workstation computer 42 and requests a picture identification from the player.

Referring to FIG. 6, the player establishes a personal identification number and deposits funds into his electronic account as delineated supra. The player is then issued a players card if necessary.

The player then approaches at least one particular gaming machine $G_N$ and inserts the player card into the card reader 82. The card reader 82 then preferably displays a casino greeting, the players name and points balance and a menu/overlay on the display 86.

The player can access the menu/overlay for account wagering system transactions by pressing the enter button or other designated button on the keypad 84 at any time.

If the player wants to perform a balance inquiry or an account transfer, the controller assembly 90 will prompt him for his PIN. The player enters his PIN via the card reader keypad 84 and presses the enter key. The controller assembly 90 passes the request to the system 20 to confirm that the player is a valid player and to confirm the players PIN.

For every transaction, the above information is checked by the system 10 for validity. If the information is acknowledged as valid, the player will be allowed access to the account and may proceed with further transactions. If the information is invalid, the player will be denied access to the related account. Denial messages include:

a. Transaction denied (i.e., invalid player, invalid PIN, less than minimum transfer amount, greater than maximum transfer amount, incompatible amount for machine denomination, inactive account, suspended account, hold account, greater than maximum credit meter amount, etc.). An error number will be associated with the message for diagnostic purposes.

b. System down.

c. Insufficient funds.

If an invalid PIN is entered three times, the account is preferably automatically disabled (automatic suspended status). The player must contact an authorized user to reactivate the account. A PIN will be required each time the menu system is accessed. If no activity within the menu system occurs for approximately ten seconds after the controller assembly 90 receives the information, the system will require the PIN to be entered again.

The approval or denial is passed to the system 20 and then passed from the system 20 to the machine controller assembly 90. If the transaction is approved, the player account balance is also sent to the machine controller 90. The controller assembly 90 displays an authorization or denial message on the keypad display 86.

The balance inquiry displays for the player his available account balance and point balance. The player is preferably required to hold down the enter key on the keypad 84 in order to display his balances. If the player does not hold down the enter key on the keypad, the balances will not be displayed and the request will be canceled approximately ten seconds after the controller assembly 90 receives the information.

The transfer request displays a sub-menu for the player to choose to receive or withdraw funds or to deposit or return funds. If the player chooses to withdraw funds, he has the option to withdraw from his account or to convert bonus points into cash (if allowed by the casino).

If the player chooses to make a withdraw from his account, the controller assembly 90 displays the available balance (the controller assembly has the information from the player's account access approval). The player will input the amount requested up to all of the player's funds and then press the enter key. The amount requested will be sent to the controller assembly 90 where range checking will be performed. If the amount is outside the system ranges, the controller 90 displays the acceptable ranges. If the amount is within the system ranges, the controller assembly 90 passes the request to the system 20 which will pass the request to the account wagering system 20. The account wagering system 20 authorizes or denies the request based upon the available account balances. The denial process will be the same as that described above. If the transaction is authorized, the account wagering system 20 deducts the amount requested temporarily and passes the authorization to the system 20. The system 20 will pass the authorization to the controller assembly 90. The controller assembly 90 displays a transaction completed message on the card reader display 86 and places the appropriate credits onto the credit meter 88.

The controller assembly 90 then sends an acknowledgment to the system 20 that the credits were placed onto the credit meter 88. The account wagering system 20 moves the funds from a temporary reduction in the available balance to a permanent reduction. All transaction details will be documented by account wagering system 20.

If the player requests to deposit funds back to his account, the account wagering system 20 displays the total available credits in dollars to be deposited. The player will input the amount to be deposited (partial or full amount) and press the enter key. The amount to be deposited will be sent to the controller assembly 90 where range checking will be performed. If the amount is outside the system ranges, the controller assembly 90 displays the acceptable ranges on the display 86. If the amount is within the system ranges, the controller assembly 90 passes the request to the account wagering system 20. The account wagering system 20 receives the amount to be deposited and places the deposited amount in a temporary player deposit balance. The account wagering system 20 then acknowledges the receipt of the deposit to the controller assembly 90. When the controller assembly 90 receives the acknowledgment, credits in the amount of the deposit will be removed from the credit meter 88. The controller assembly 90 then sends an acknowledgment to the system 20 which informs the system 20 that the credits were removed. When the account wagering system 20 receives the acknowledgment, the deposit is moved from temporary storage to permanent storage.

Markers

In marker play the player transfers money from the electronic account to the gaming machine $G_N$. The balance available shown to the player includes all deposits including markers. Non-marker funds will be utilized first by the system 10 when transfers are made to the gaming machine. Once marker funds are accessed, the available balance is reduced.

When the player plays the gaming machine $G_N$ and wishes to transfer an amount back to the electronic account, the amount of the transfer from the gaming machine $G_N$ to the account will not immediately be applied to the marker. The automatic application of funds from the electronic account to existing marker balances will only occur when the player attempts to withdraw funds from the enrollment station 40. ///

Player Point Conversion

A player inserts his player card in the card reader 82 and selects a point conversion key on the keypad. The controller assembly 90 updates information to the system 20 which checks and updates files in the player tracking module 64.

The player tracking module 64 sends available points and dollar amounts to the system 20 which in turn sends the available points and dollar amounts to the controller 90. The controller 90 preferably displays the available points and dollar amounts on the display 86.

The player then requests a point conversion transfer in dollars and in response, the controller 90 performs range checking and sends a request to the system 20. The system 20 authorizes or denies the request. The controller 90 can deny some requests based on parameters.

If the system 20 authorizes the request, it decrements points and writes the transaction to a file. If the controller 90 or system 20 denies the request, a message is sent to the controller 90 for display on the display 86. The following are reasons for denial:

a. Invalid player
b. Invalid PIN
c. Requested amount greater than point conversion dollar amount available (controller 98 checks range)
d. Incompatible amount for machine denomination (controller 98 checks range)
e. Account inactivated
f. Maximum credit meter amount
g. Go to casino cage (all other problems)

The player tracking module 64 updates the database 62 and the account wagering system 20 for the point conversion and transaction details. The account wagering system 20 confirms the point conversion deposit amount and sends confirmation to the controller assembly 90 which increments the credit meter 88 on the gaming machine $G_N$ for the dollar equivalent of points converted.

Redemption Apparatus

The Redemption apparatus 110 allows players on the casino floor to access their available point and complementary dollar balances, as well as receive vouchers for cash and complimentaries.

Figure 9:
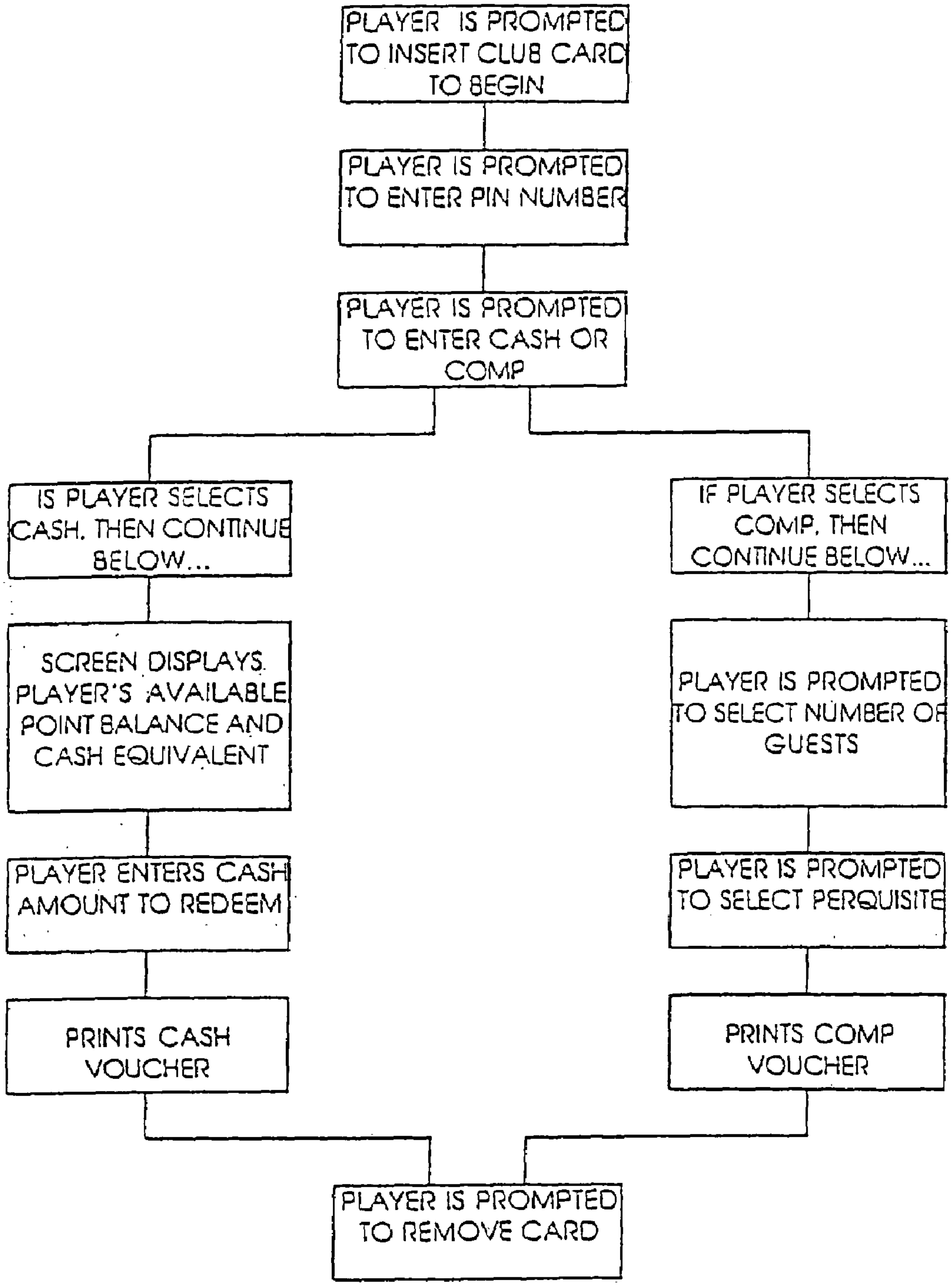
FIG. 9 is a flow diagram for using the redemption apparatus according to one form of the present.

Referring to FIGS. 4 through 4B and FIG. 9, the player is prompted to insert his/her player card in the card reader 126 to activate the redemption process. The touch screen 132 then displays a graphical keypad 125 and instructions to prompt the player to enter his/her PIN via the touch screen 132. The touch screen 132 then prompts the player to enter cash or comp.

A display of the following information appears on the touch screen when the cash option is chosen:

Points available.
Cash value of points.
Amount redeemed today.
Amount available today.
Max amount redeemable today.
Make redemption? Yes or No.

If a cash redemption is requested the player is prompted to enter the cash amount to be redeemed via the graphical keyboard 125. Next, the printer 128 prints a cash voucher which is distributed to the player via the voucher slot 130.

If the player selects the comp option, the touch screen 132 of the redemption apparatus 110 prompts the player for the number of guests and the perquisite requests and its casino outlet location. The apparatus 120 then prints a complimentary voucher. At the end of a request the player is prompted to remove their player card and the apparatus 110 would return to the idle mode with the attraction screen displayed.

Specifically, when the player enters the player selected Personal Identification Number (PIN) using the graphical touch keypad 125 displayed on the screen 132 the card number is sent to the physical keypad 124 using the controller assembly 120 interface. It is communicated to the controller assembly 120 from the redemption computer 116 via a communication link 118, which is required for protocol conversion.

The PIN and card number are validated using player files stored in the player database 62. When a valid PIN has been entered, the touch screen 132 will display the list of services delineate above. The player selects the desired service using the touch screen 132. The request is transmitted, as described above, and edited using files. When a valid request is made, the redemption apparatus 110 will respond appropriately.

For example, the request to check a point balance will display the player's point balance on the screen, while the request for a comp will produce a printed comp ticket.

Moreover, having thus described the invention, it should be apparent that numerous structural modifications and adaptations may be resorted to without departing from the scope and fair meaning of the instant invention as set forth hereinabove and as described hereinbelow by the claims.

I claim:

1. A method of operating gaming machines connected to a system computer associated with a database, each of said gaming machines having a credit meter and a player activatable entry device, comprising:

creating a player account in said database associated with at least one player, said player account having an account balance amount;

establishing credits on said credit meter of one of said gaming machines;

accessing said player account responsive to a command initiated by said one player at said one of said gaming machines, said step of accessing including uploading a selected amount to said player's account, said step of accessing comprising:

(i) identifying the selected amount by the player using said player activatable entry device;

(ii) removing a quantity of credits from said credit meter of said one gaming machine in accordance with said identified amount; and (iii) increasing said account balance amount in said player account in accordance with said identified amount.

2. A method according to claim 1 wherein said player activatable entry device is a keypad.

3. A method according to claim 1 wherein said identified amount is an amount in dollars.

4. A method according to claim 1, wherein said one of said gaming machines is associated with a card reader, said method further includes:

providing a player card to said one player;

and wherein said step of accessing said player account includes:

reading said player card using said card reader.

5. A method according to claim 4 and wherein said method further includes:

providing a player identification number associated with said player card to said one player; and wherein said step of accessing said player account includes:

inputting said player identification number using said player activatable entry device.

6. A method according to claim 1 wherein each of said gaming machines has a display device.

7. A method according to claim 1 wherein said player activatable device includes a designated activation area.

8. A method according to claim 7 wherein said designated activation area is an activatable button.

9. A method according to claim 7 wherein each of said gaming machines has a display device;

and wherein said step of accessing said player account further includes activating said designated activation area; and displaying a menu on said display device in response to said activating of said designated activation area.

10. A method according to claim 9 and wherein said step of accessing said player account further comprises:

prompting said player for activating said player activatable entry device to enter a personal identification number.

11. A method according to claim 9 wherein said method further includes:

providing a player identification number to said one player; and wherein said step of accessing said player account includes:

inputting said player identification number using said player activatable entry device.

12. A method according to claim 11 wherein said one of said gaming machines is associated with a card reader, said method further includes:

providing a player card to said one player;

and wherein said step of accessing said player account includes:

reading said player card using said card reader.

13. A method according to claim 1 and wherein said step of accessing said player account further comprises:

prompting said player for activating said player activatable entry device to enter a personal identification number.

14. A method according to claim 13 wherein said method further includes:

providing a player identification number to said one player; and wherein said step of accessing said player account includes:

inputting said player identification number using said player activatable entry device.

15. A method according to claim 14 wherein said one of said gaming machines is associated with a card reader, said method further includes:

providing a player card to said one player;

and wherein said step of accessing said player account includes:

reading said player card using said card reader.

16. A method according to claim 1 wherein said one gaming machine has a display device; and wherein the total credits on said credit meter of said one gaming machine are displayed in dollars on said display device.

17. A method according to claim 1 wherein said selected amount is an amount in dollars.

18. A method according to claim 1 wherein said step of increasing said account balance amount includes adding a deposit amount to said account balance amount, said deposit amount equal to the value of said quantity of credits removed from said credit meter.

19. A method according to claim 1 wherein said quantity of credits is a whole number representative of a whole number of plays of said gaming machine.

20. A method according to claim 18 wherein said one gaming machine has a display device; and wherein the total credits on said credit meter of said one gaming machine are displayed in dollars on said display device.

* * * * *